Figure 1:
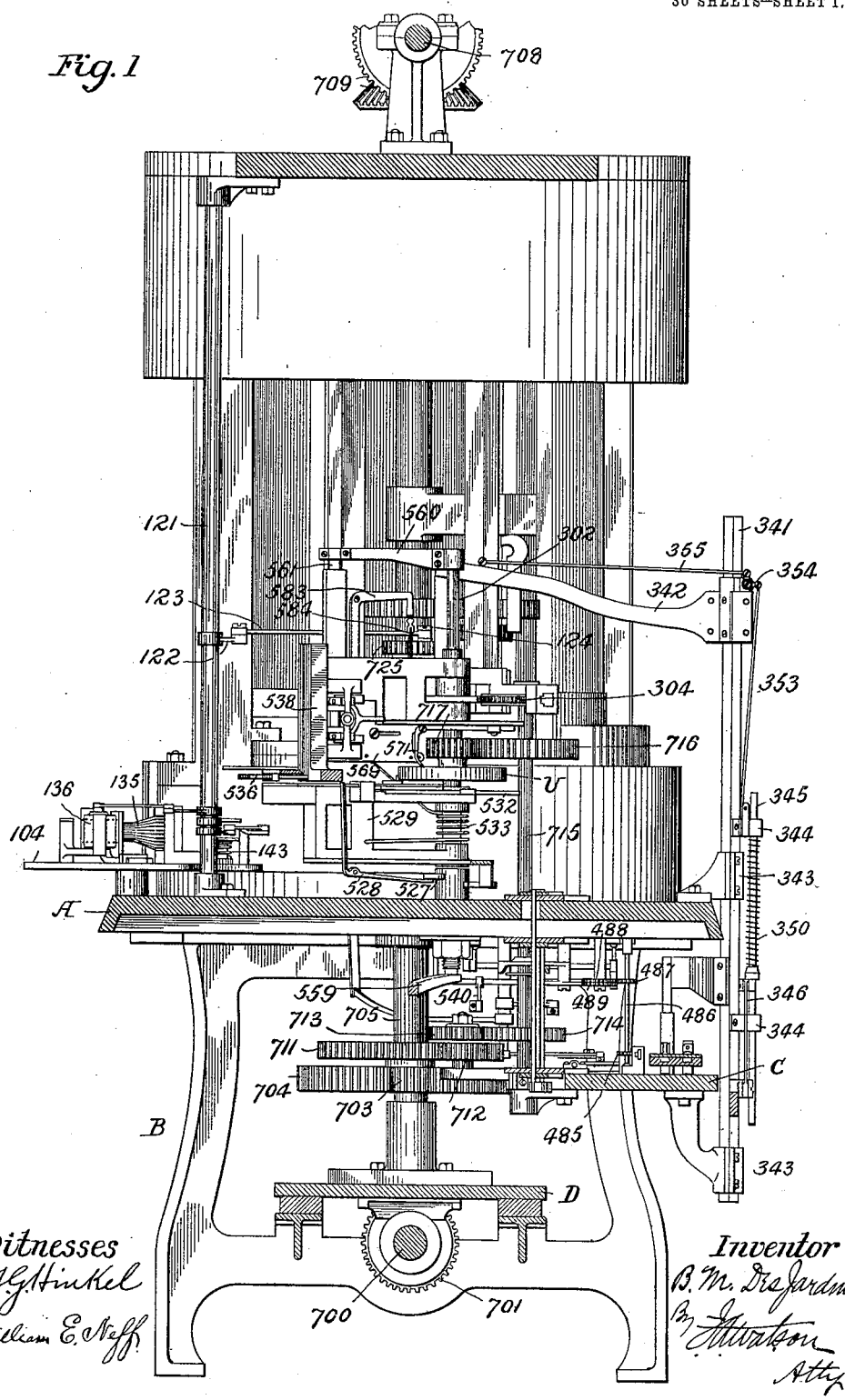

B. M. DES JARDINS.
TYPE JUSTIFYING MECHANISM.
APPLICATION FILED MAY 15, 1899.

1,070,235.

Patented Aug. 12, 1913.

30 SHEETS—SHEET 1.

Witnesses
J. G. Hinkel
William E. Neff

Inventor
B. M. Des Jardins
By H. H. Watson
Atty

B. M. DES JARDINS.
TYPE JUSTIFYING MECHANISM.
APPLICATION FILED MAY 15, 1899.

1,070,235.

Patented Aug. 12, 1913.
30 SHEETS—SHEET 4.

Witnesses
J. G. Hinkel
William E. Neff

Inventor
B. M. Des Jardins
By F. H. Watson
Atty

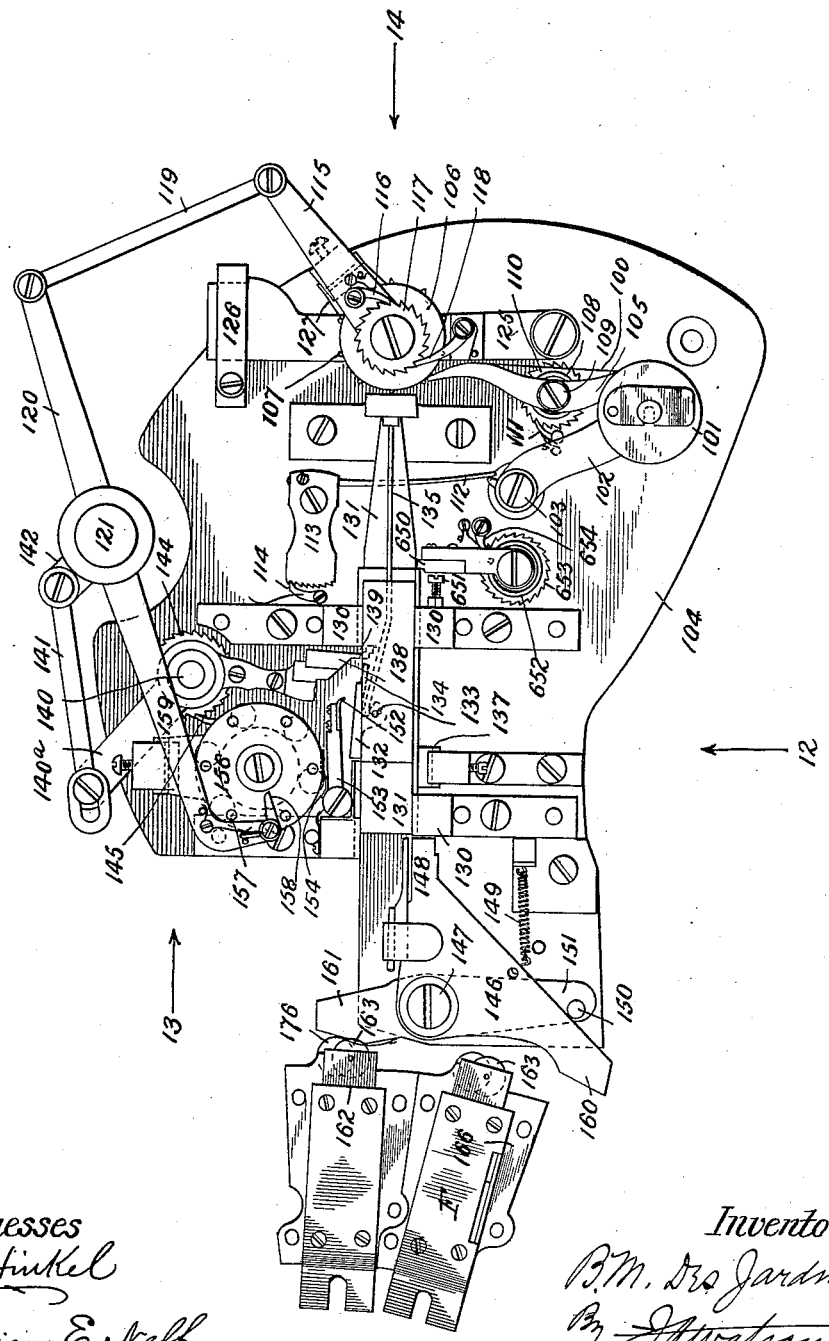

B. M. DES JARDINS.
TYPE JUSTIFYING MECHANISM.
APPLICATION FILED MAY 15, 1899.
1,070,235.
Patented Aug. 12, 1913.
30 SHEETS—SHEET 12.
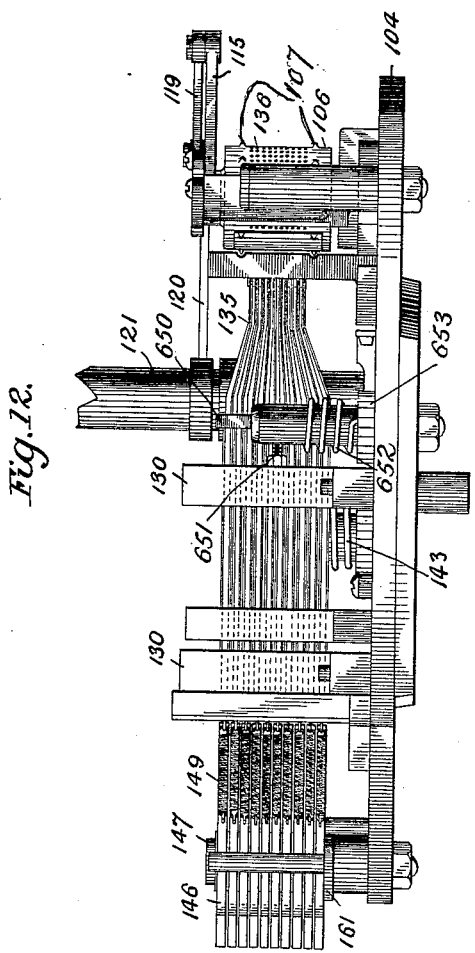
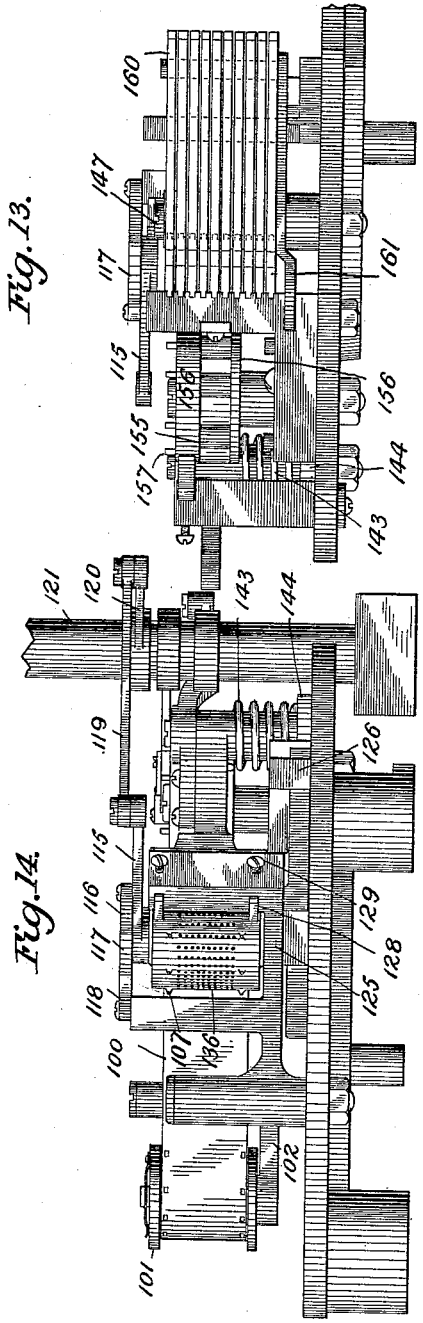
Witnesses
J. G. Hinkel
William E. Neff
Inventor
B. M. Des Jardins
By J. T. Watson
Atty.

B. M. DES JARDINS.
TYPE JUSTIFYING MECHANISM.
APPLICATION FILED MAY 15, 1899.
1,070,235.
Patented Aug. 12, 1913.
30 SHEETS—SHEET 13.
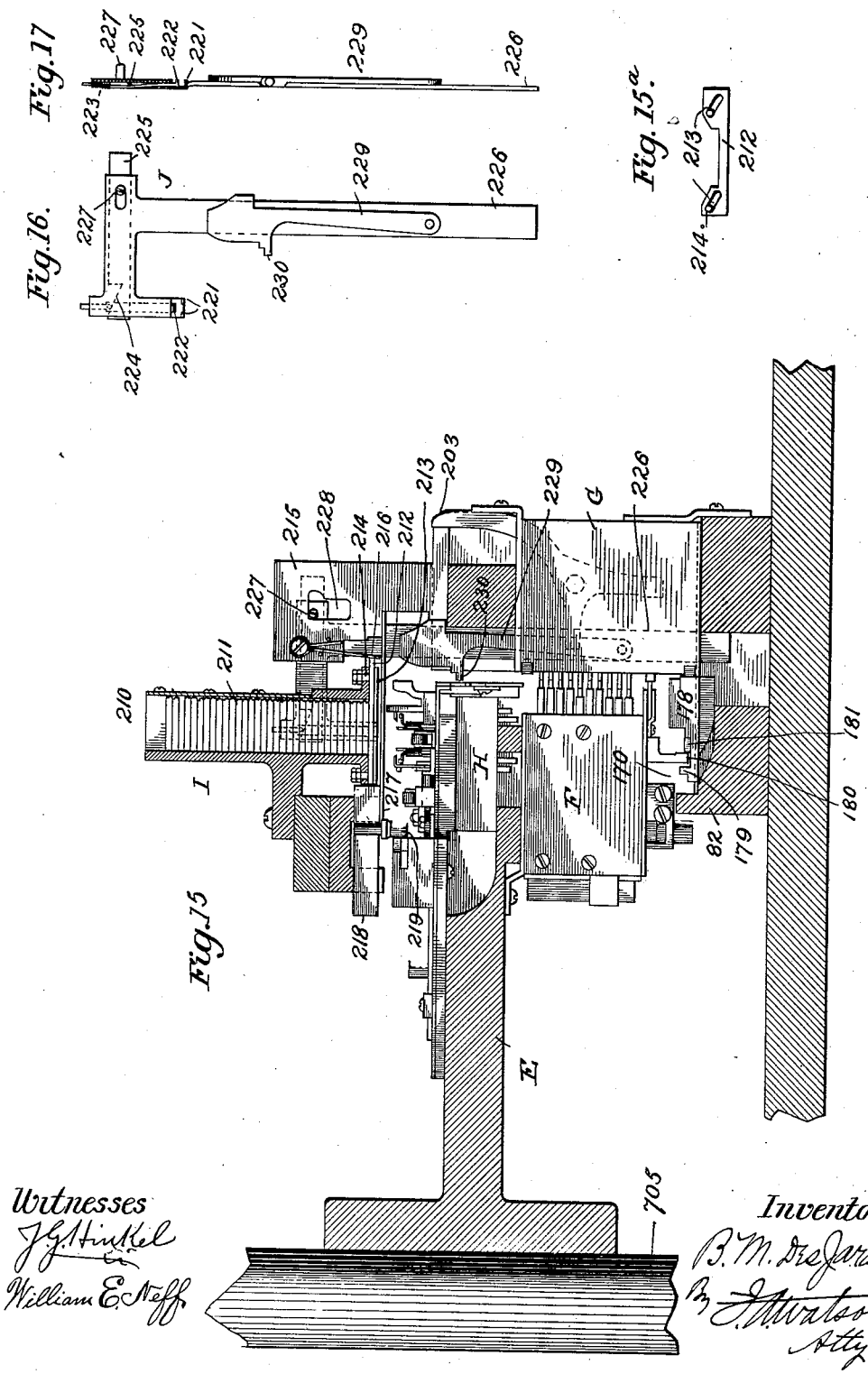

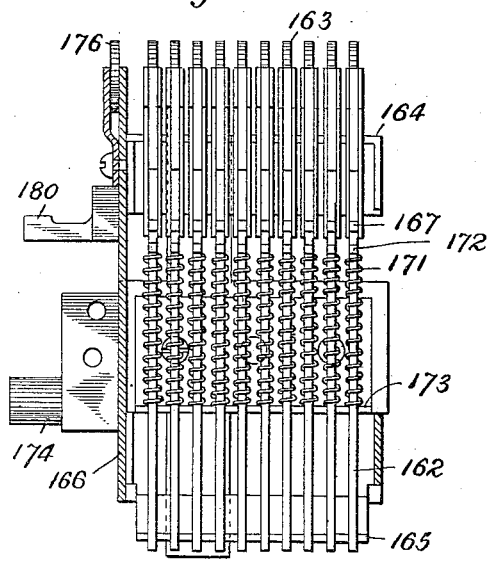
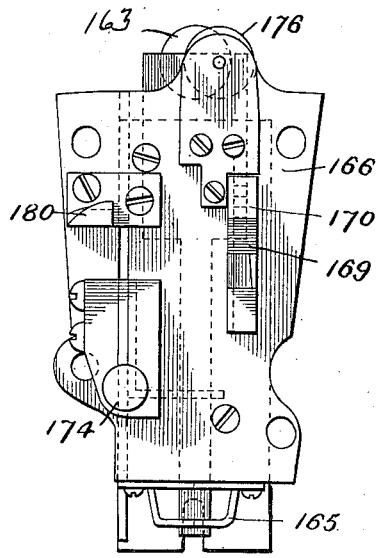
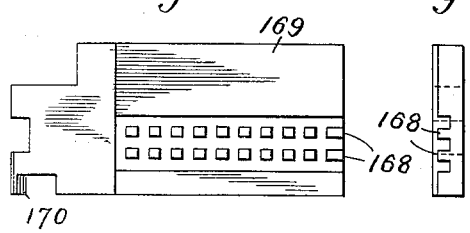
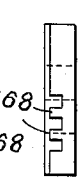
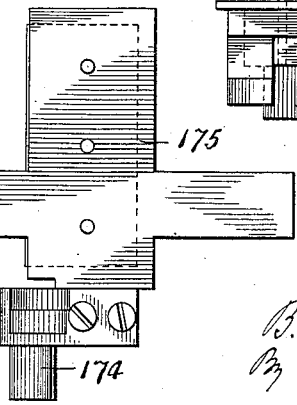
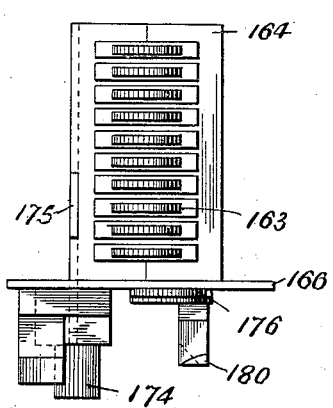

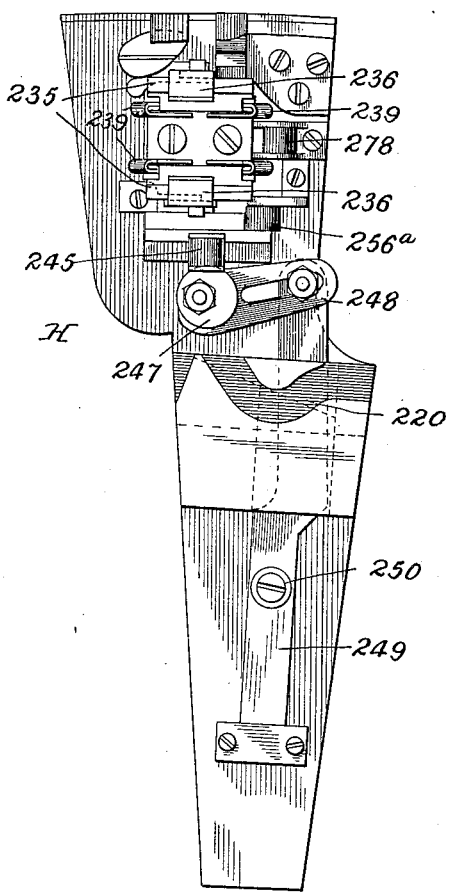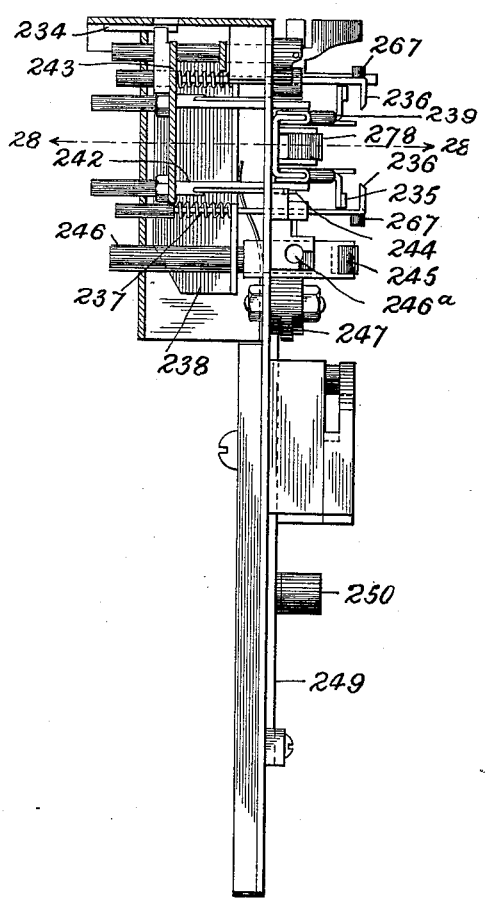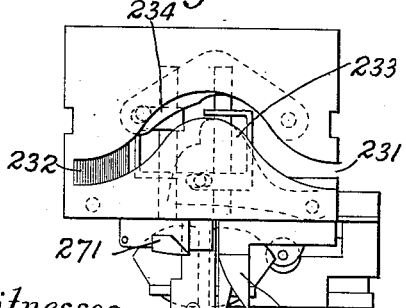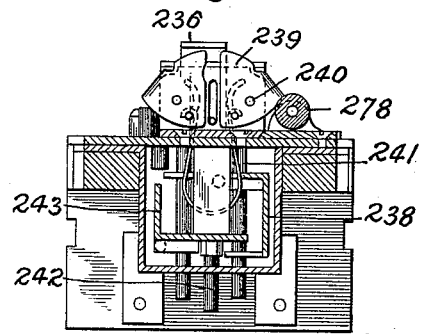

B. M. DES JARDINS.
TYPE JUSTIFYING MECHANISM.
APPLICATION FILED MAY 15, 1899.
1,070,235.
Patented Aug. 12, 1913.
30 SHEETS—SHEET 16.
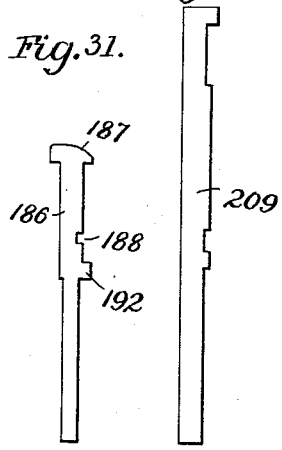
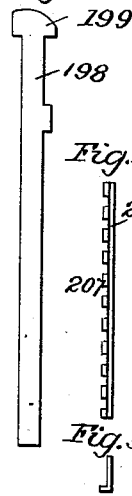
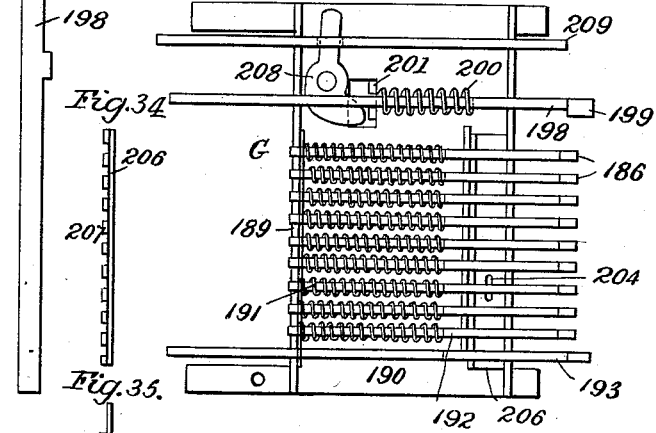
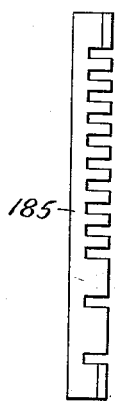
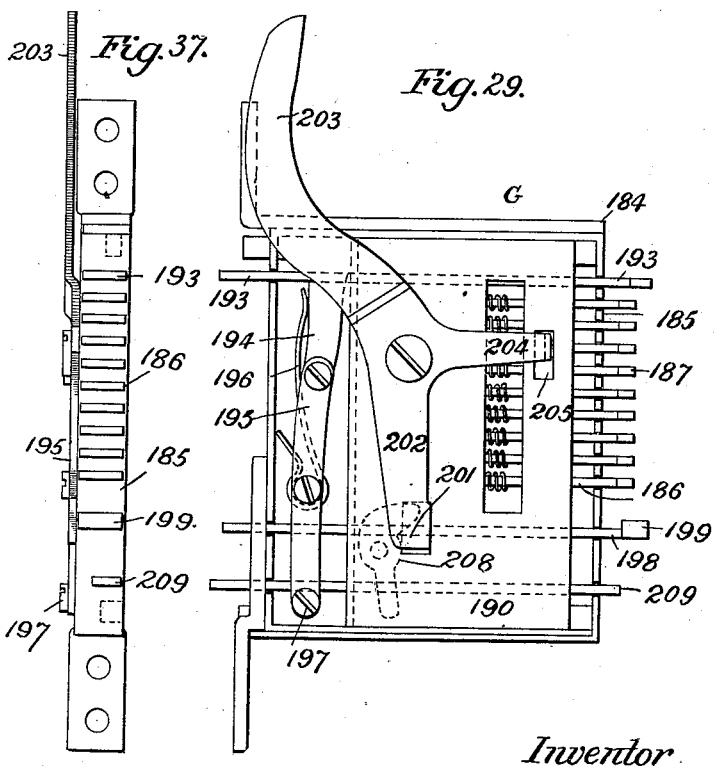

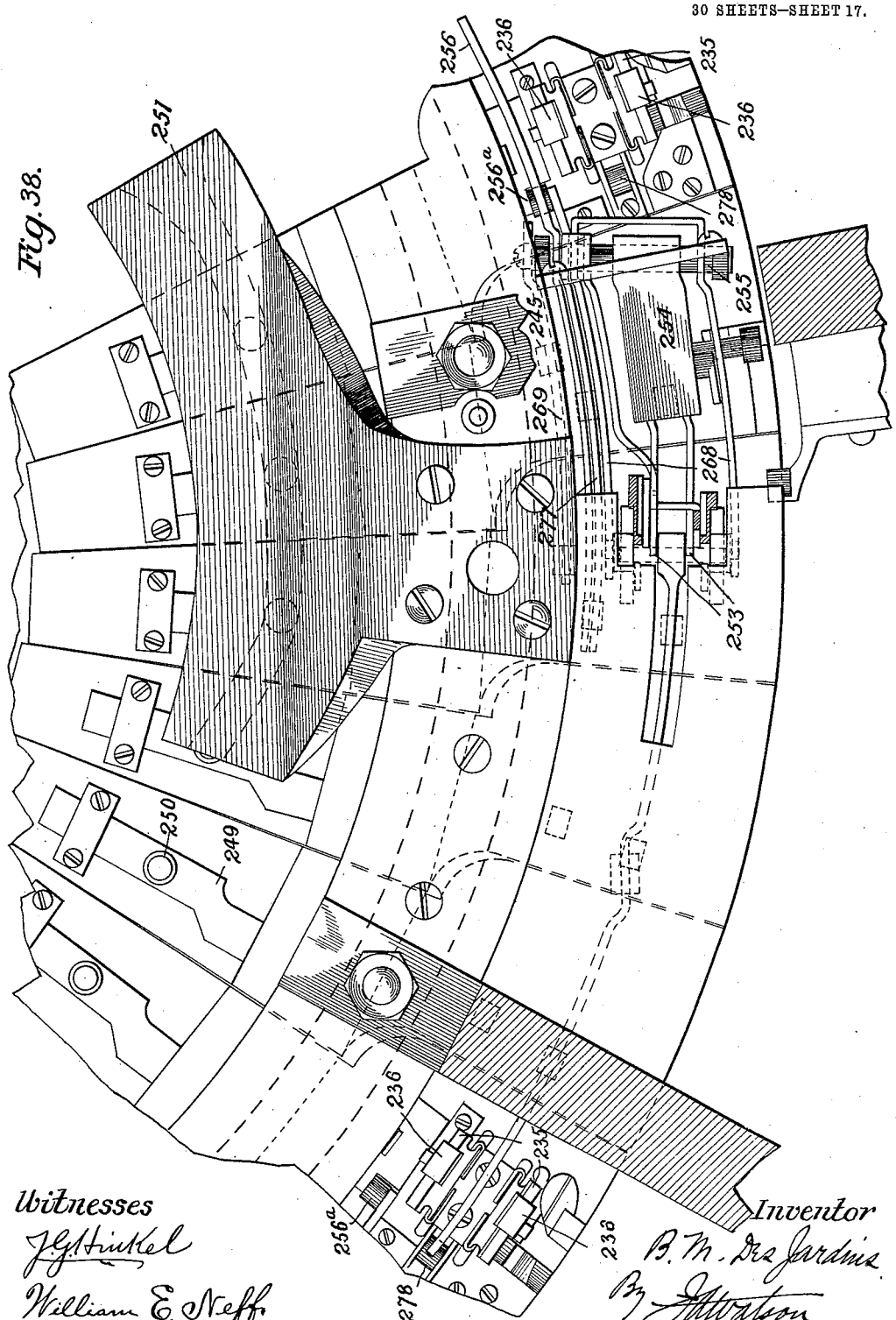

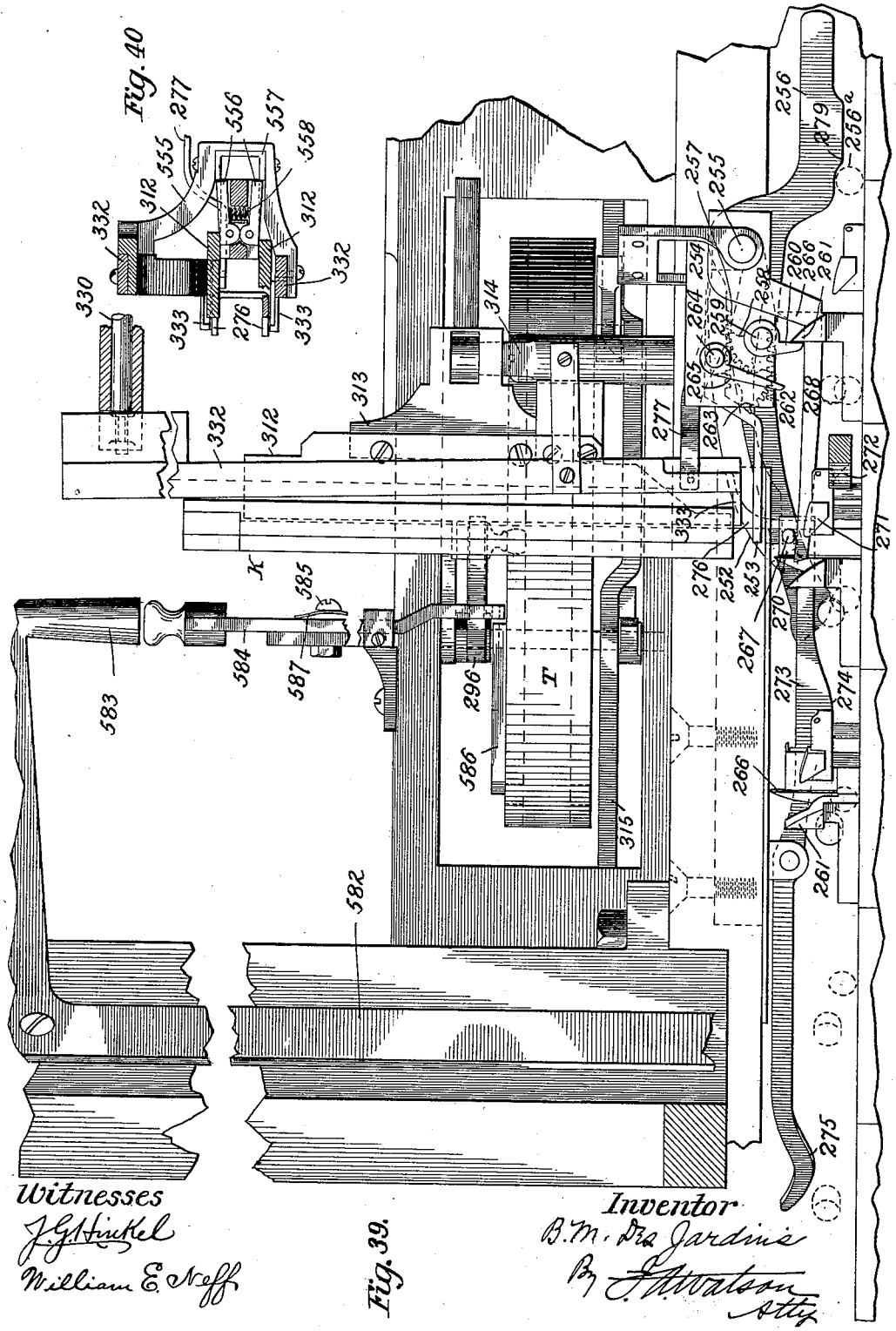

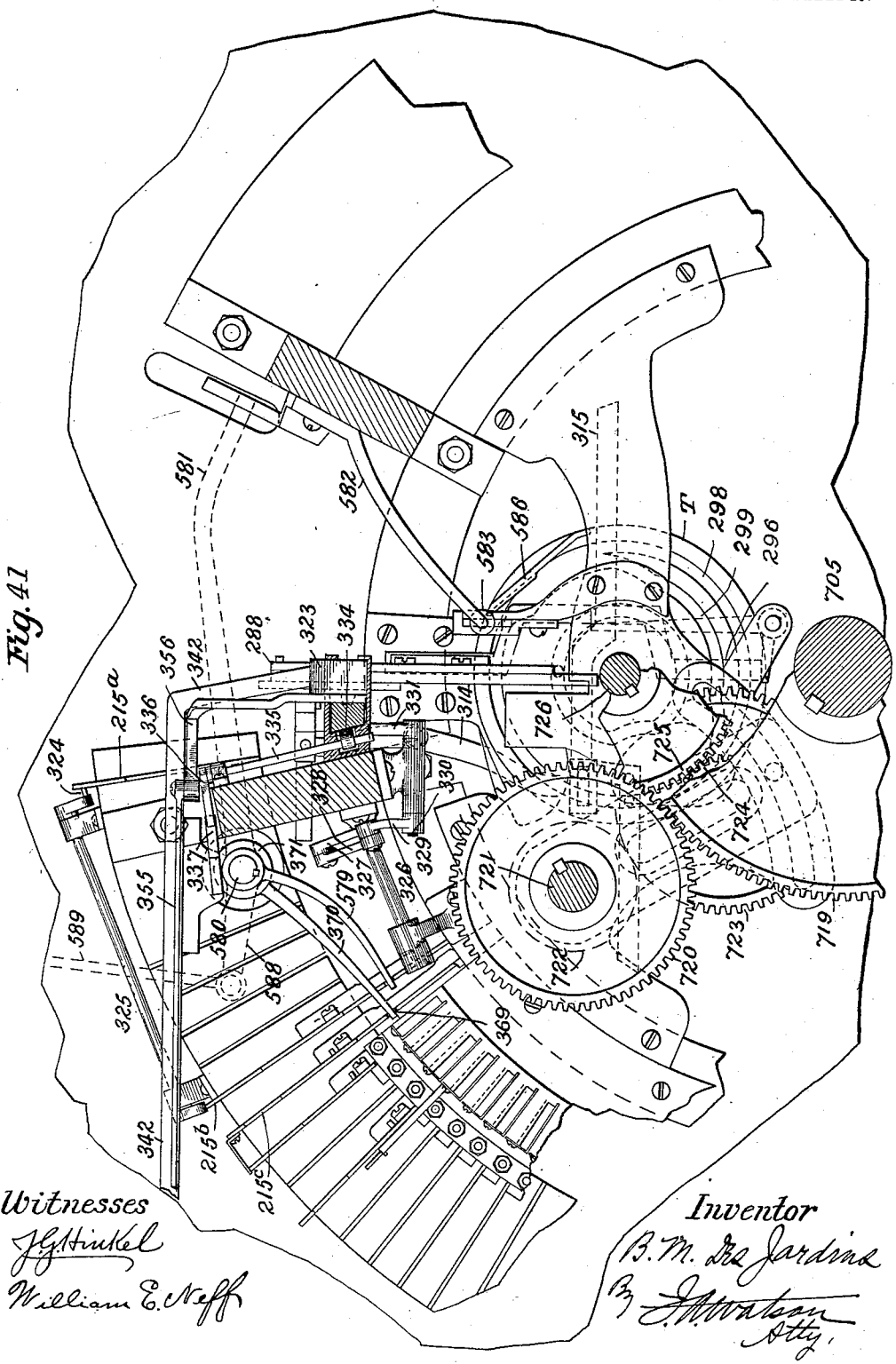

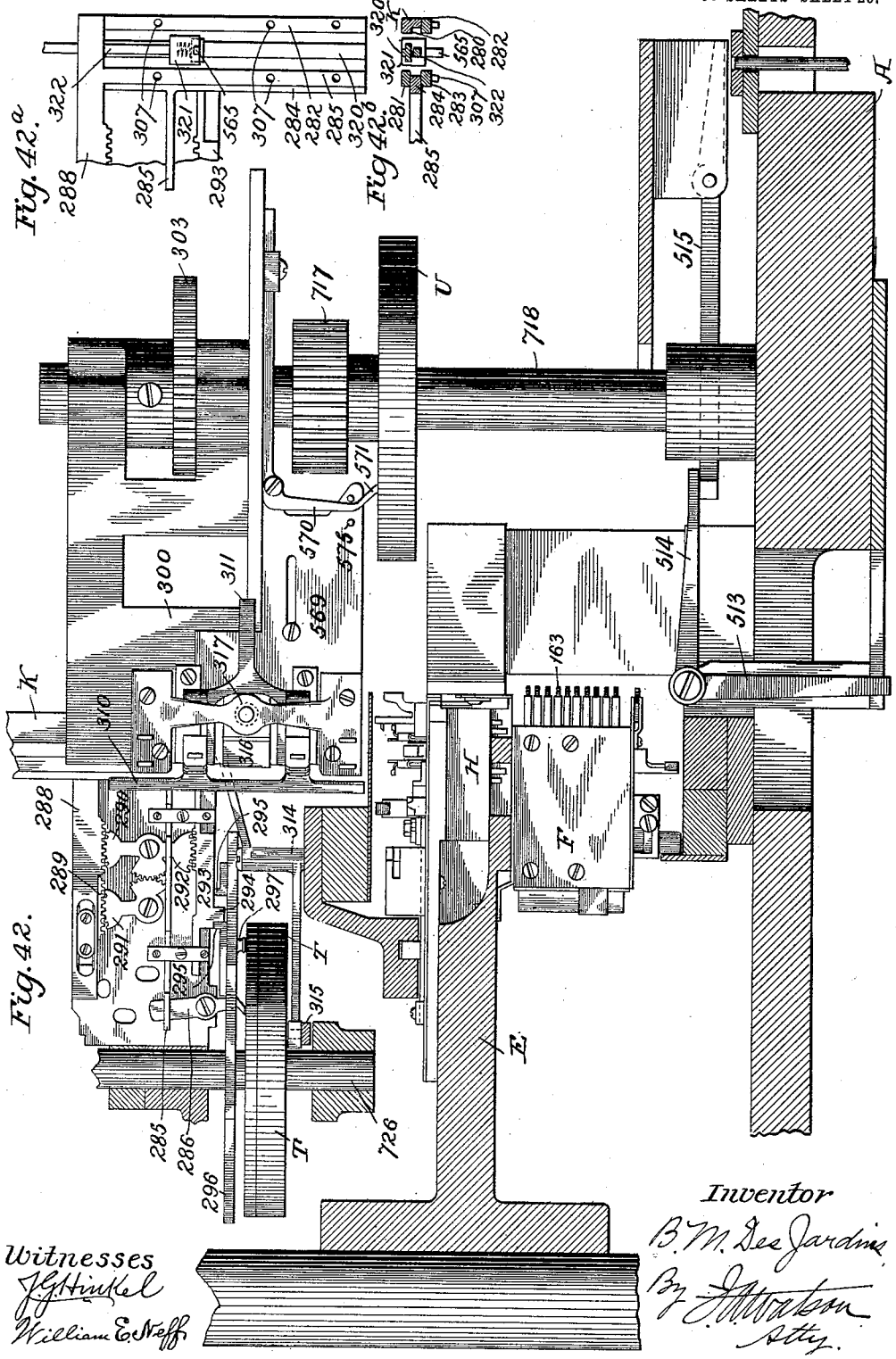

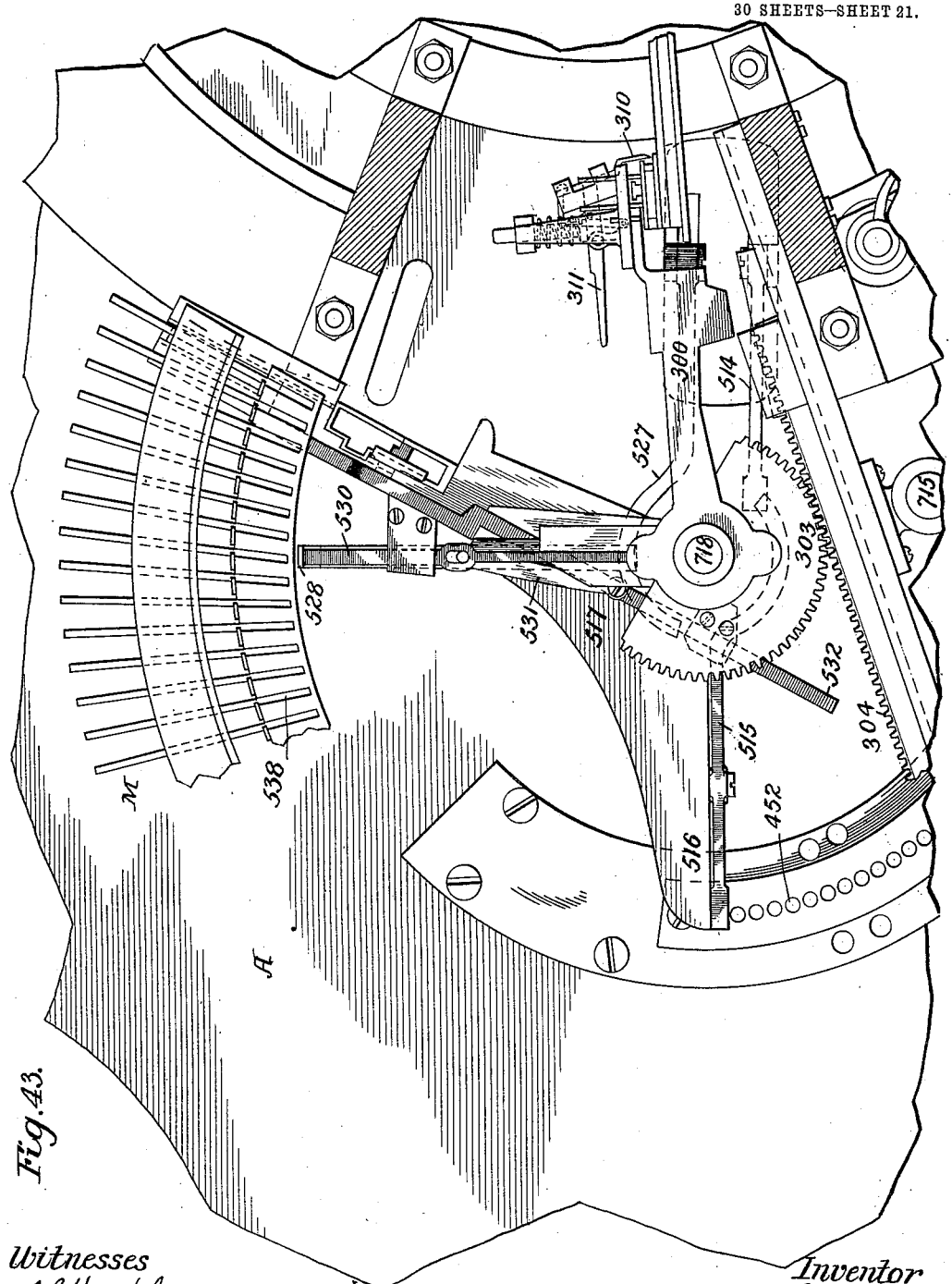

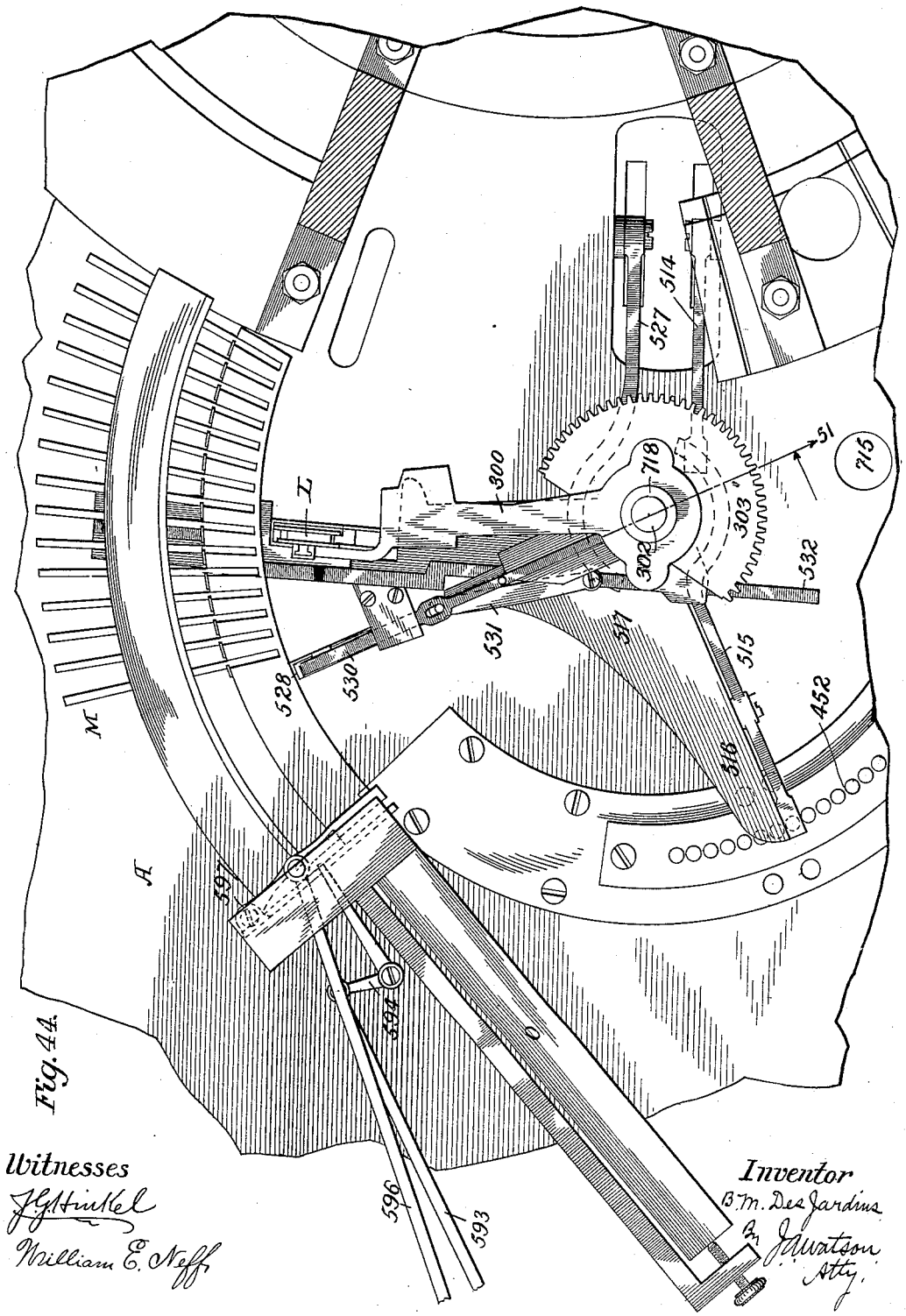

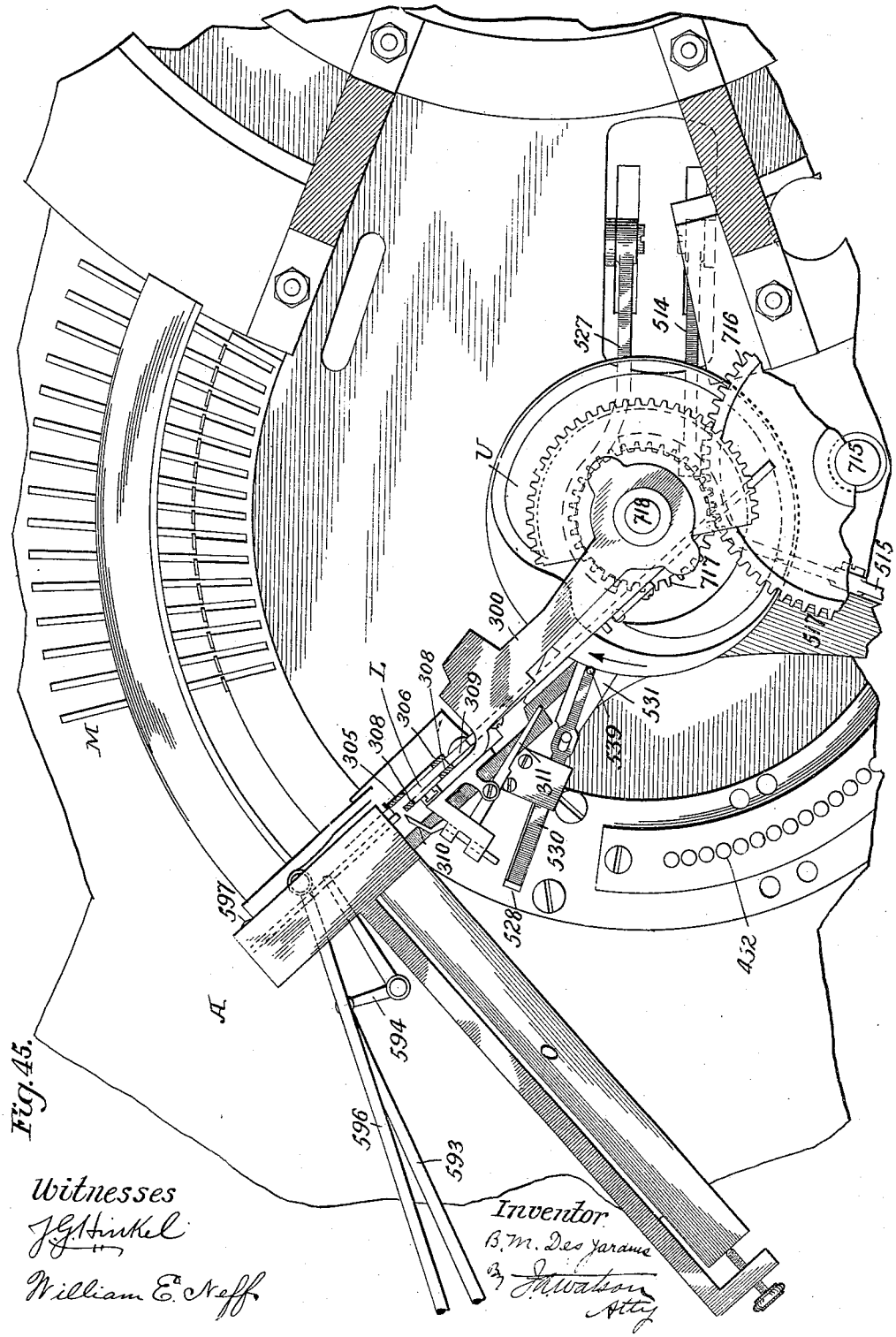

B. M. DES JARDINS.
TYPE JUSTIFYING MECHANISM.
APPLICATION FILED MAY 15, 1899.
1,070,235.
Patented Aug. 12, 1913.
30 SHEETS—SHEET 24.
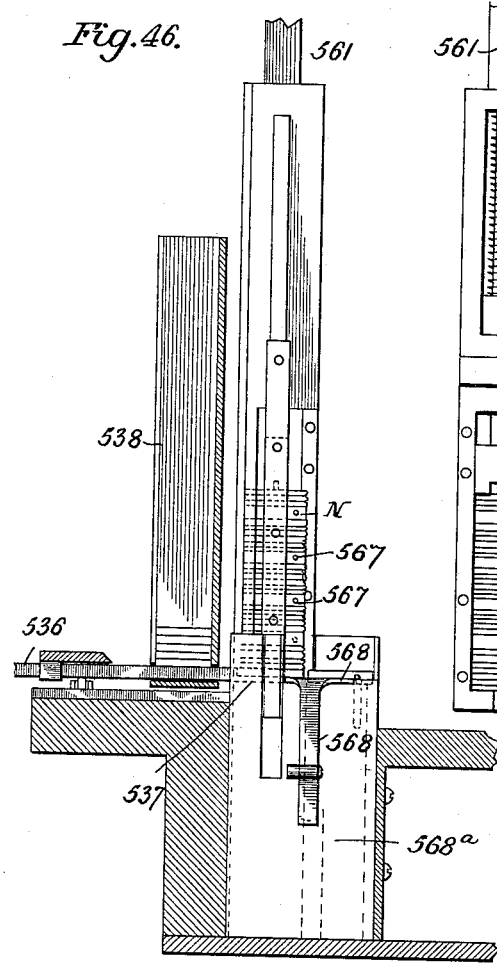
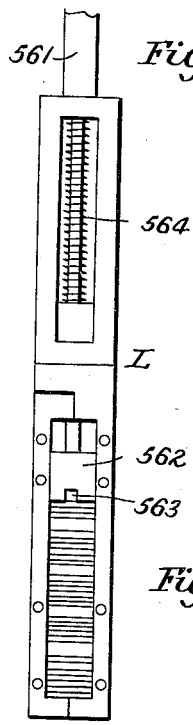
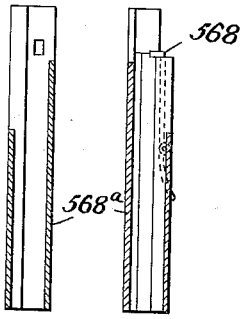
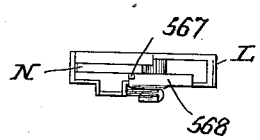
Witnesses
J. G. Hinkel
William E. Neff
Inventor
B. M. Des Jardins
By J. A. Watson
Atty.

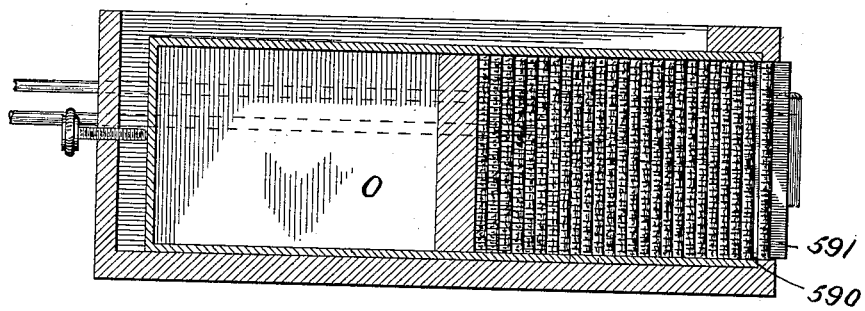
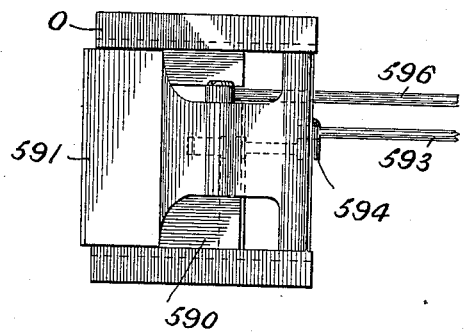

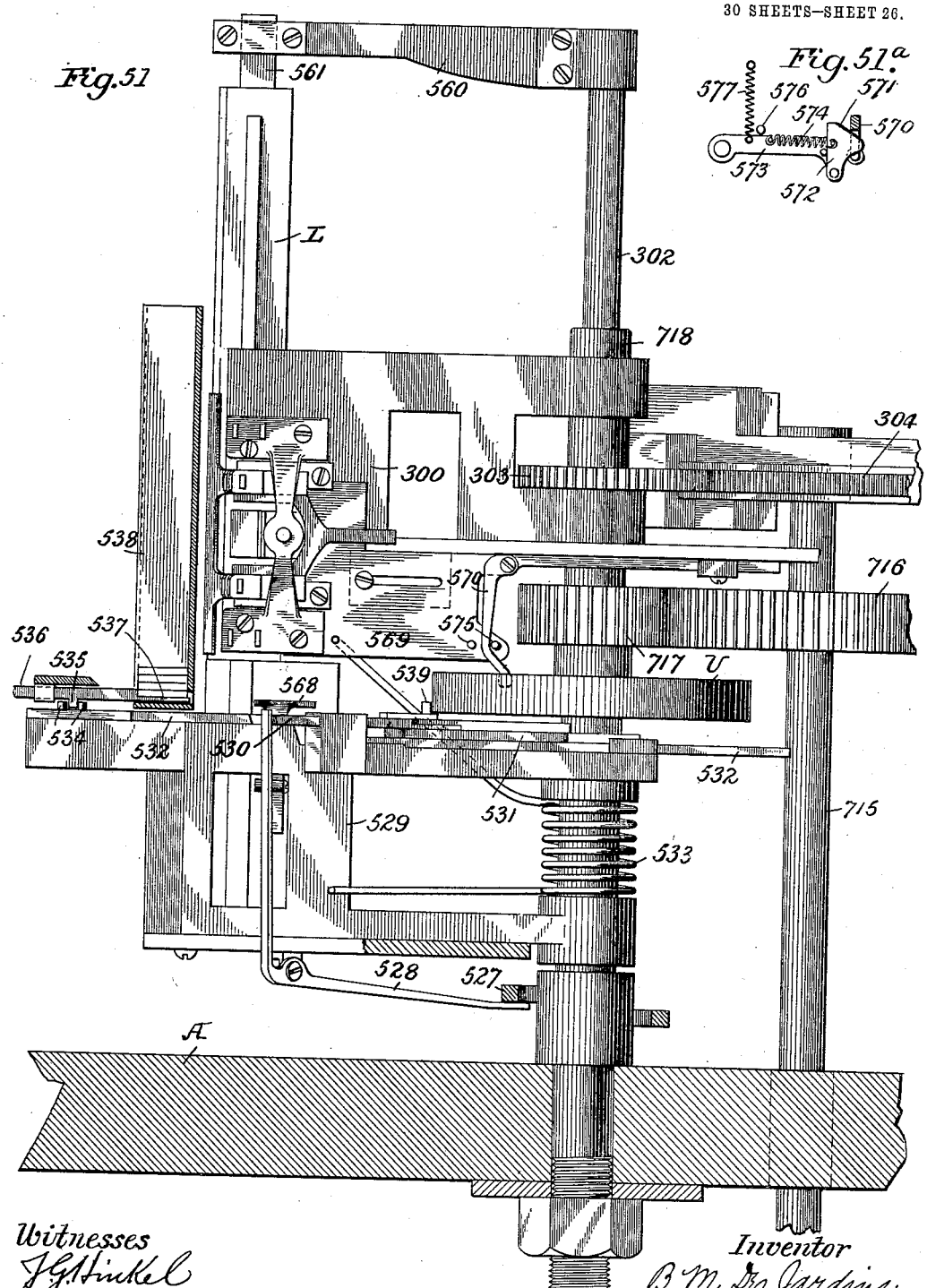

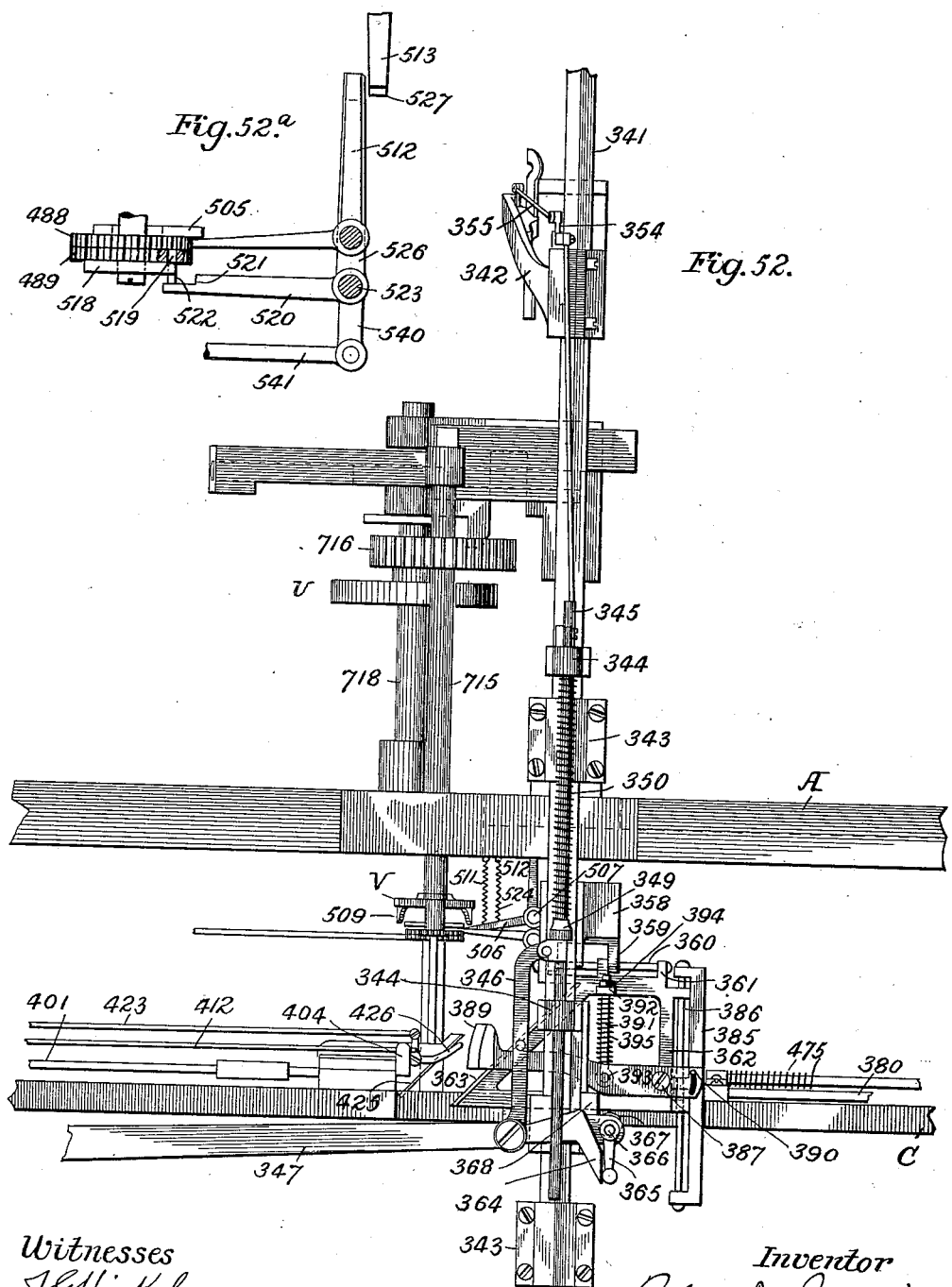

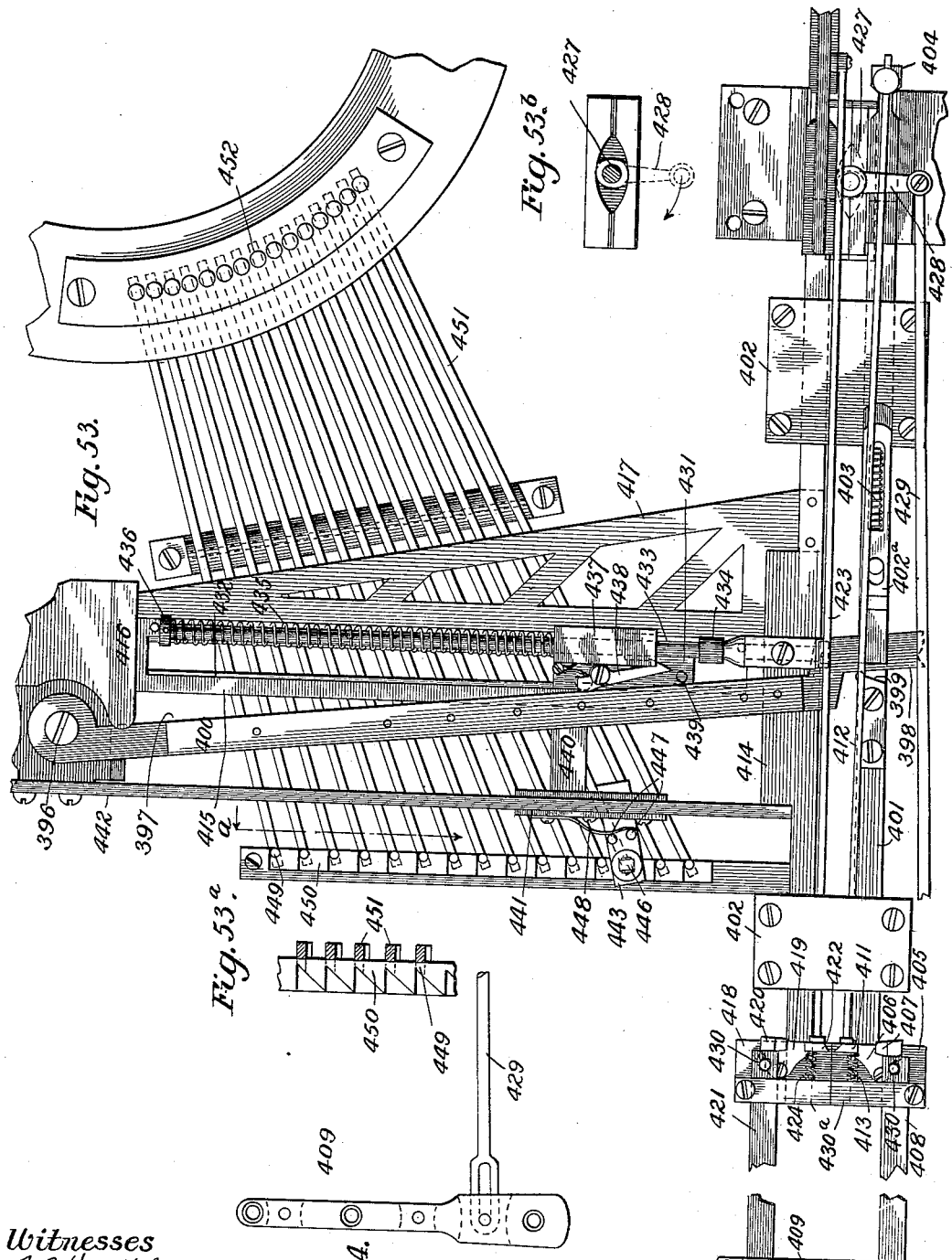

B. M. DES JARDINS.
TYPE JUSTIFYING MECHANISM.
APPLICATION FILED MAY 15, 1899.
1,070,235.
Patented Aug. 12, 1913.
30 SHEETS—SHEET 29.
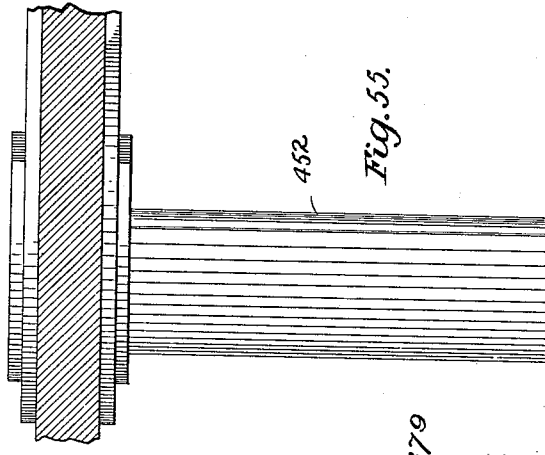
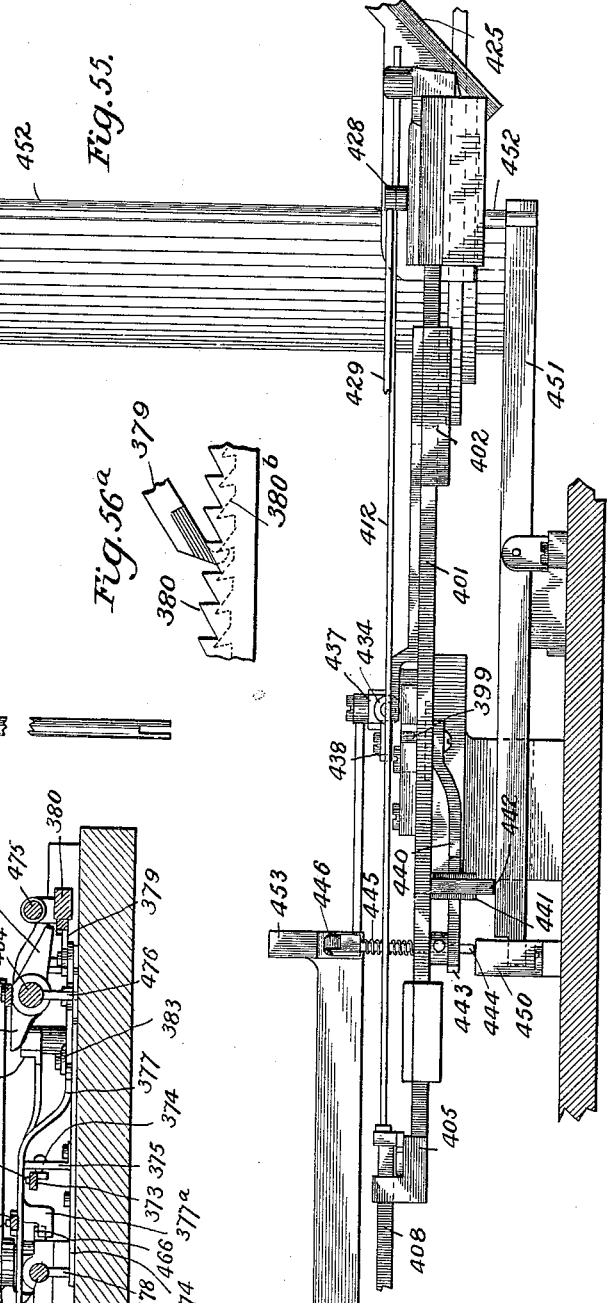
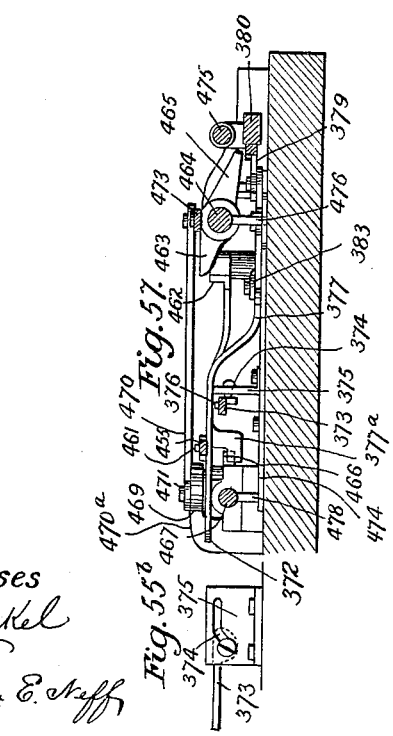
Witnesses
J. G. Hinkel
William E. Neff
Inventor
B. M. Des Jardins
By J. H. Watson
Atty

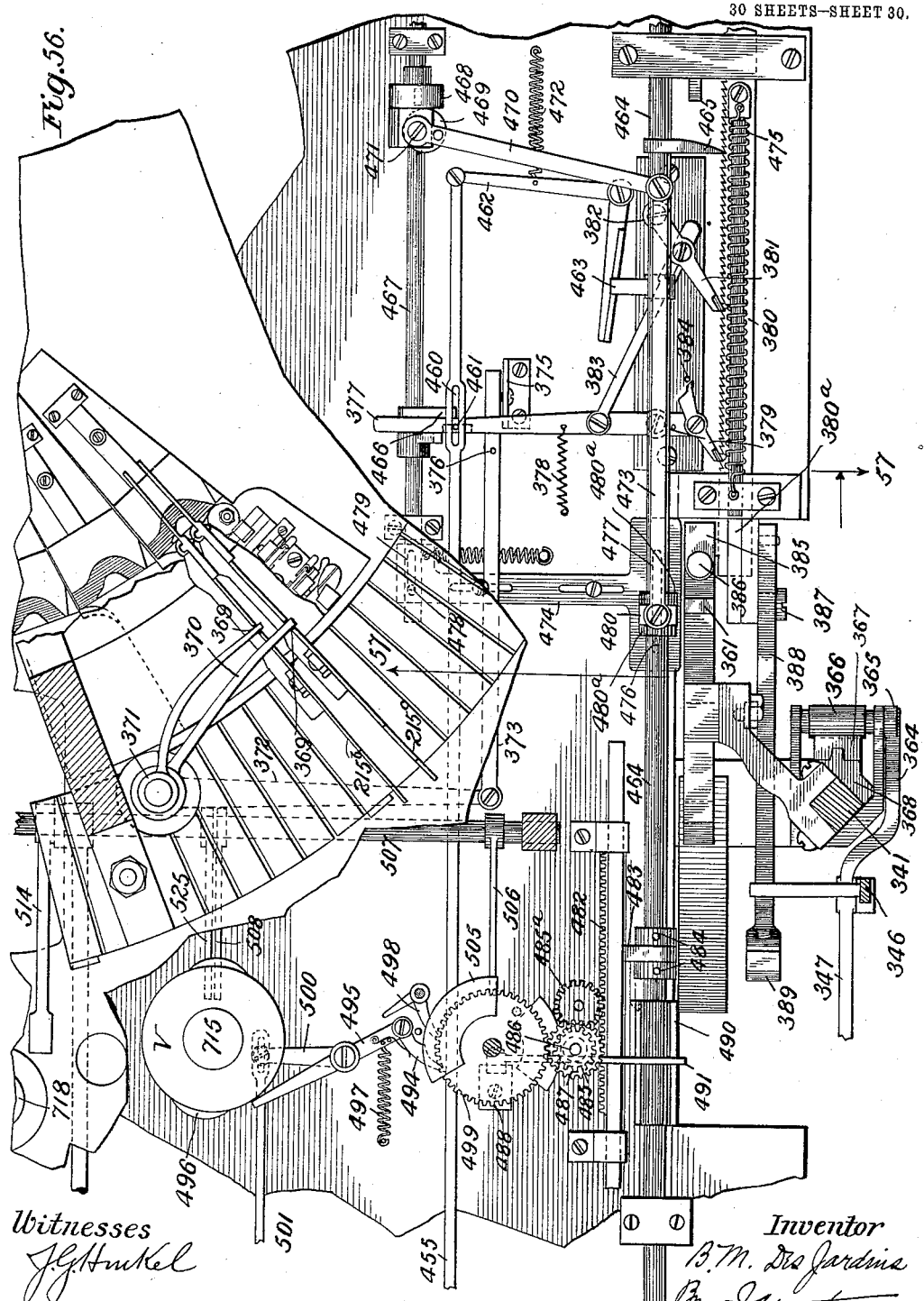

UNITED STATES PATENT OFFICE.

BENJAMIN M. DES JARDINS, OF WEST HARTFORD, CONNECTICUT, ASSIGNOR, BY MESNE ASSIGNMENTS, TO THE UNITYPE COMPANY, OF MANCHESTER, CONNECTICUT, A CORPORATION OF NEW JERSEY.

TYPE-JUSTIFYING MECHANISM.

1,070,235.

Specification of Letters Patent.

Patented Aug. 12, 1913.

Application filed May 15, 1899. Serial No. 716,915.

*To all whom it may concern:*

Be it known that I, BENJAMIN M. DES JARDINS, a citizen of the United States, residing at West Hartford, in the county of Hartford and State of Connecticut, have invented certain new and useful Improvements in Type-Justifying Mechanism, of which the following is a specification.

This invention relates to automatic justifying mechanism.

The particular embodiment of the invention hereinafter described, and illustrated in the accompanying drawings, is a machine for justifying lines of type composed with temporary spaces or separators. The basic principles of the invention may, however be utilized in connection with other forms of composing machines such as linotype and matrix making machines and it is to be understood that I desire protection for the invention commensurate with its utility.

In the following specification I shall term the difference between the amount of matter in an unjustified line and the required length of the line, or column measure, the "shortage" of the line. The spaces between words in which justifying spaces are to be inserted I shall term "intervals", and the pieces utilized to separate the words in the unjustified lines I shall term "separators", the number of intervals and separators in a line being, of course, one less than the number of words. The final quads or pieces used to separate the words in the justified lines will be termed "justifying spaces". The shortage of the line divided by the number of intervals will give the average width of the justifying spaces and this average width I shall term a "normal space" in contradistinction to the justifying spaces which may in some instances be partly less and partly greater in width than the normal. The term "type" as used herein will be understood to include matrices, such as are used in linotyping, as well as ordinary printers' type.

In justifying composed lines of type it is impossible to provide in advance the number of different sizes which would be required to justify every line with normal spaces. I use instead a magazine provided with a limited number of sizes differing from each other by a fixed amount which, for convenience, I shall term a "unit". It will be evident that any line may be justified by combining spaces comprising no more than two sizes differing from each other by a unit. Such justification is not absolutely correct but in practice it always comes within a half unit of the column measure and the units may be made sufficiently small to effect practically perfect justification by the use of a sufficient number of space values. In the accompanying drawing I have shown a space magazine having fifteen sizes of spaces but in practice a less number will generally be found sufficient, the number used depending upon the nature of the work to be done and the kind of type in use.

In the embodiment of my invention illustrated the justifying mechanism comprises, first, means for measuring or ascertaining the shortage of the unjustified line, which may be termed the measuring devices, second, means for counting the number of separators or intervals in the line, which may be called the counting devices, third, means controlled by the measuring and counting devices adapted to determine the normal justifying space for the line under treatment, fourth, means for determining what proportion of the total number of spaces in the line shall be smaller than the normal and what proportion shall be larger than the normal in order to most perfectly justify the line, this means being hereinafter termed the "difference devices", and fifth, a controlling device which is set for each line by the difference devices and serves to control the change from one side of spaces to the next during the operation of inserting the spaces. All of these devices are purely automatic in their operation in the present machine. It will be evident that the normal space value which is first determined by the justifying devices might be used to select normal spaces if there were a sufficient number of sizes in the magazine. In other forms of justifiers where the spaces are cut or cast, or where they depend upon the movement of a matrix or typewriter carriage, normal spaces may be utilized and my improved justifying devices are applicable to such machines.

In the machine illustrated in the accompanying drawings the type are set automatically, the setting of the type being controlled by a perforated strip of paper or other suitable material. In the intervals between the words temporary separators are introduced and the devices for inserting the separators are utilized to effect the counting of the intervals in the justifying apparatus. The type setting and justifying mechanisms being intimately associated I shall first describe the type setting mechanism, taking its several parts in the order in which they operate, and I shall afterward describe the line handling and justifying mechanism. The type setting mechanism takes the individual type and separators and assembles them in line in what may be termed an assembling channel, and the line handling and justifying mechanism takes the line from the assembling channel, substitutes the justifying spaces for the separators, and transfers the justified line to a galley. In the present application the type setting mechanism will not be claimed.

Figure 2:
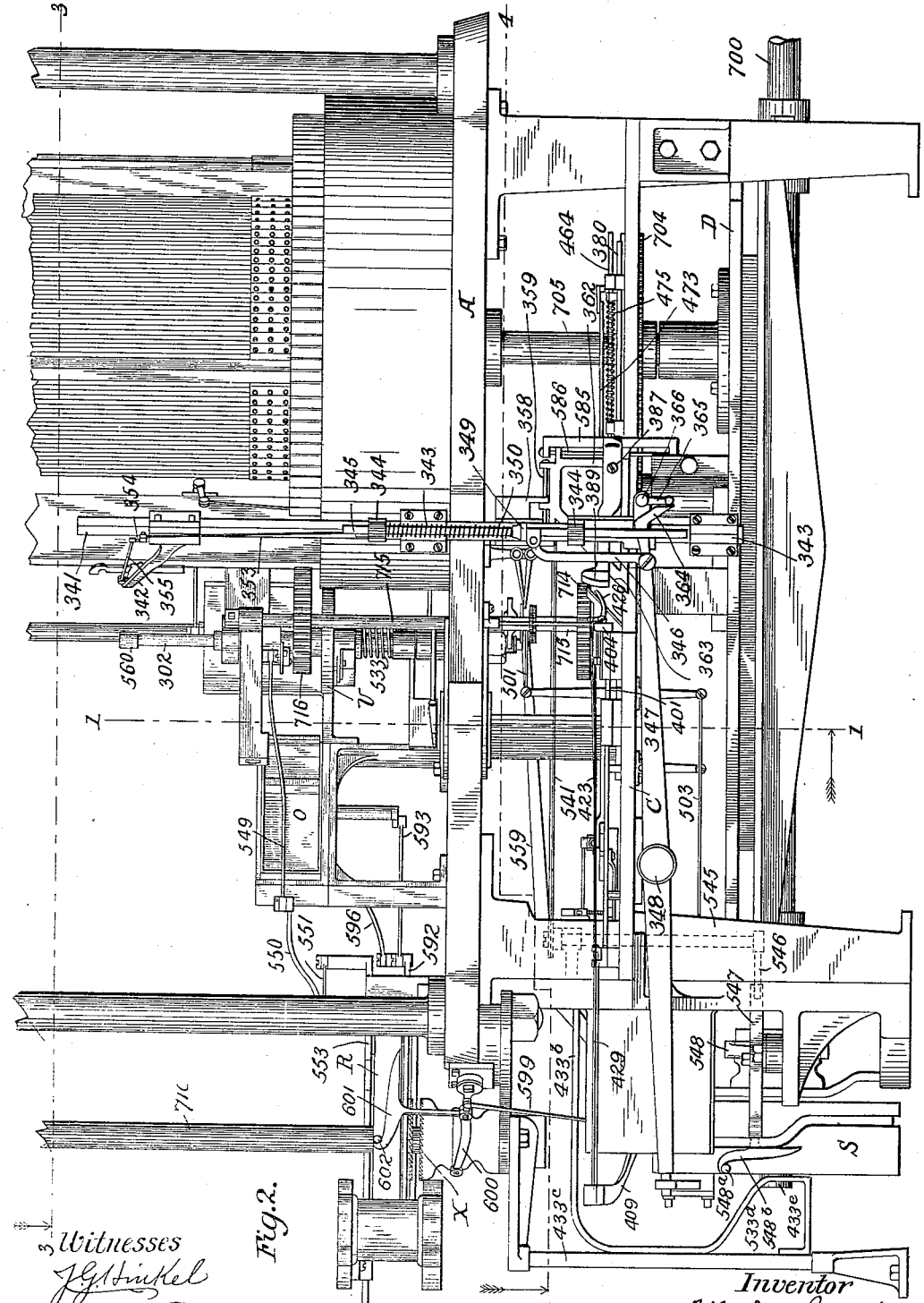
Figure 3:
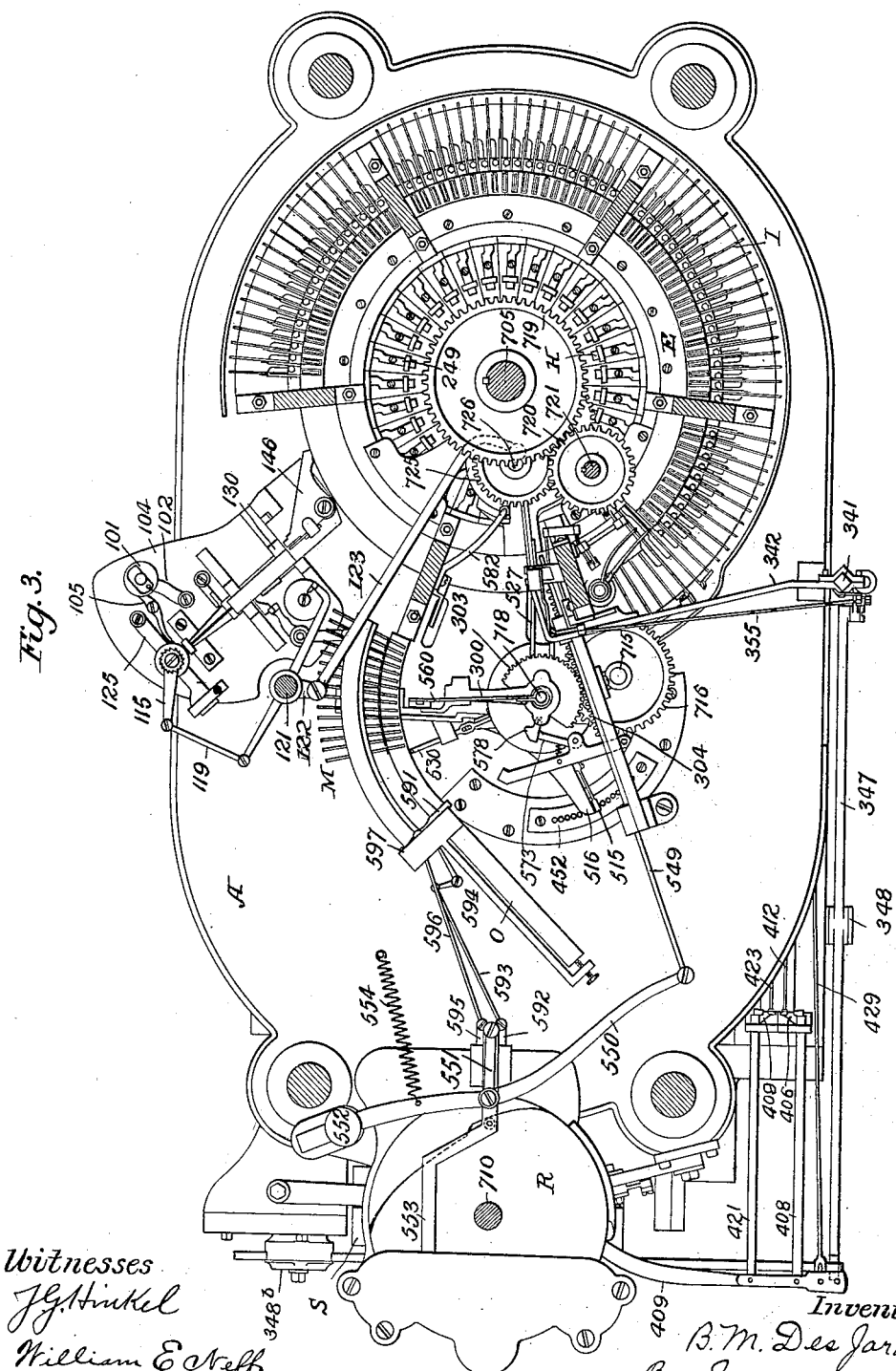
Figure 4:
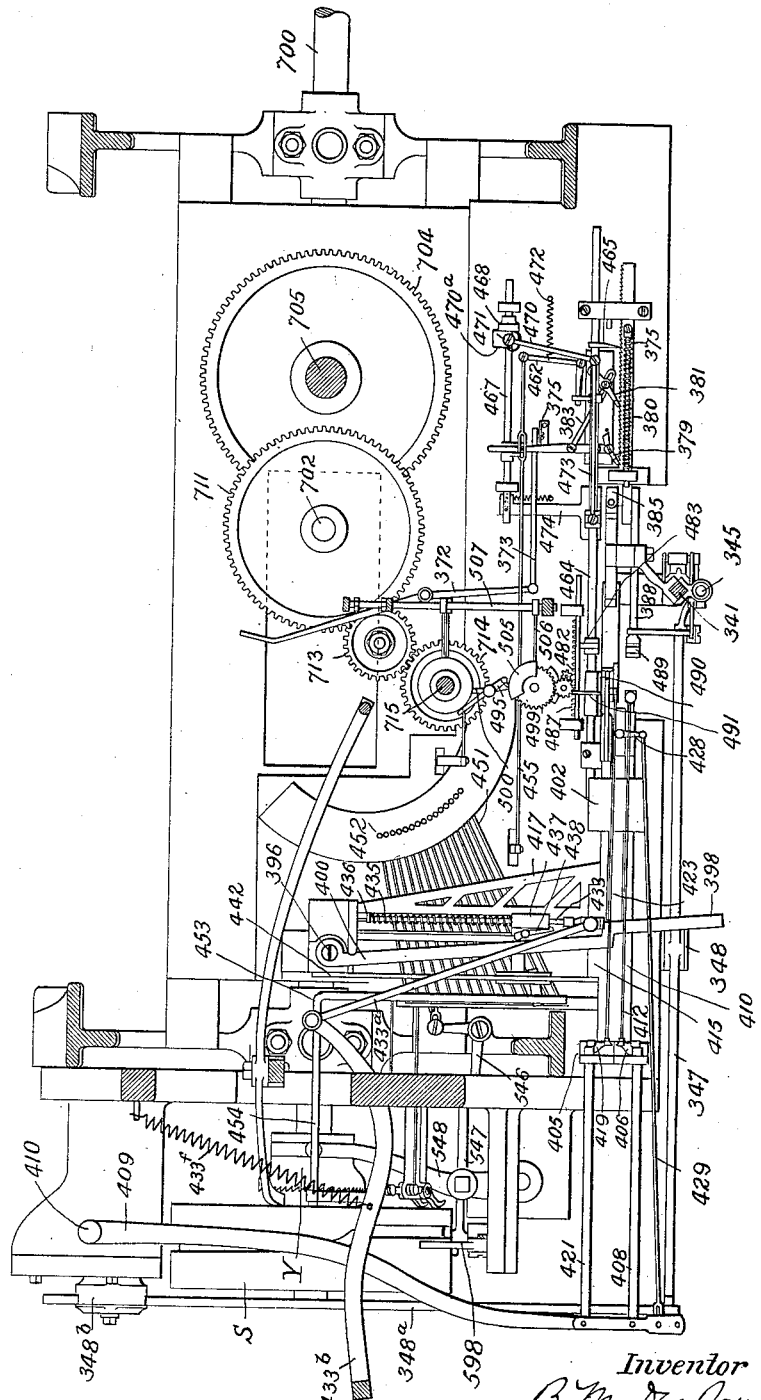
Figure 5:
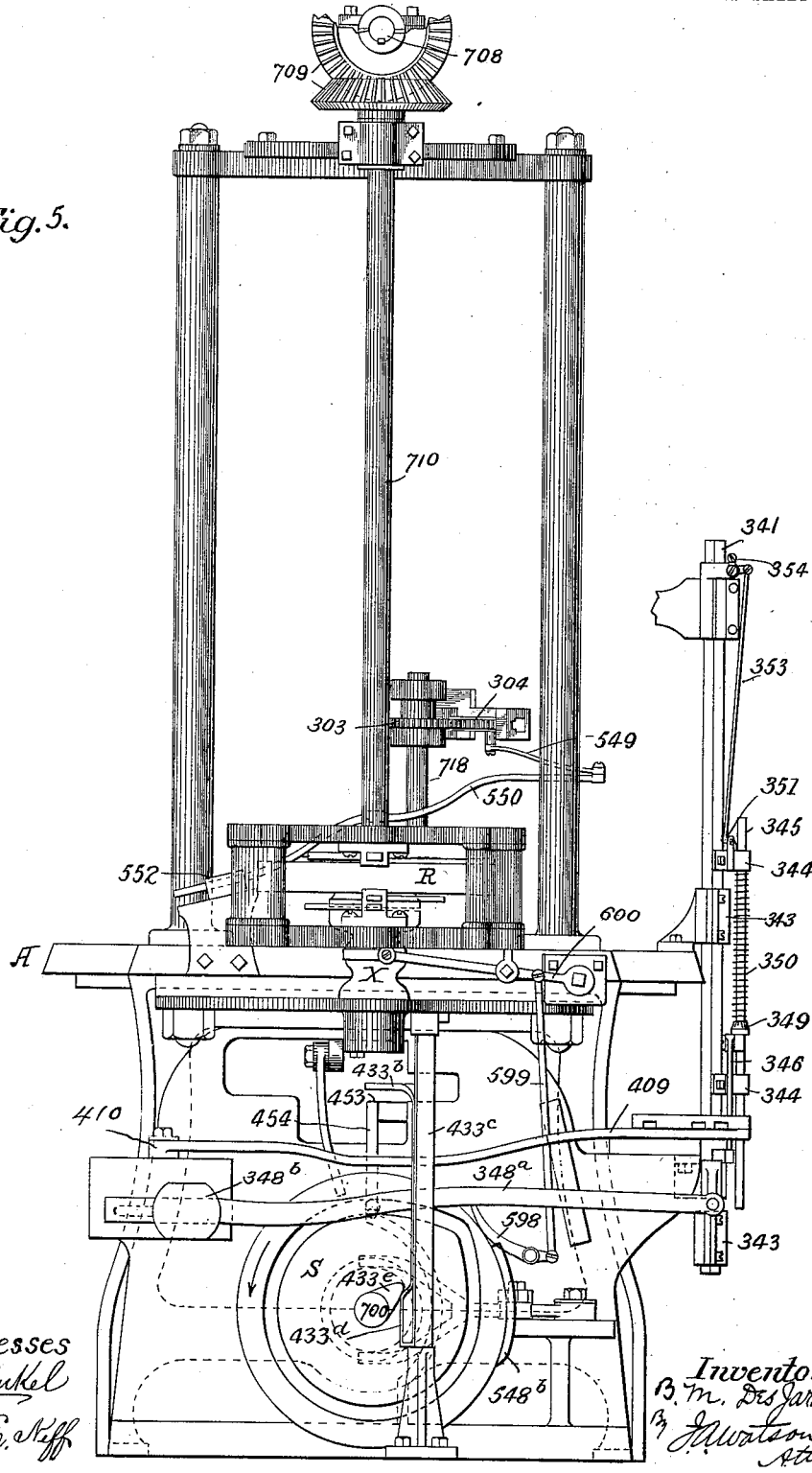
Figure 6:
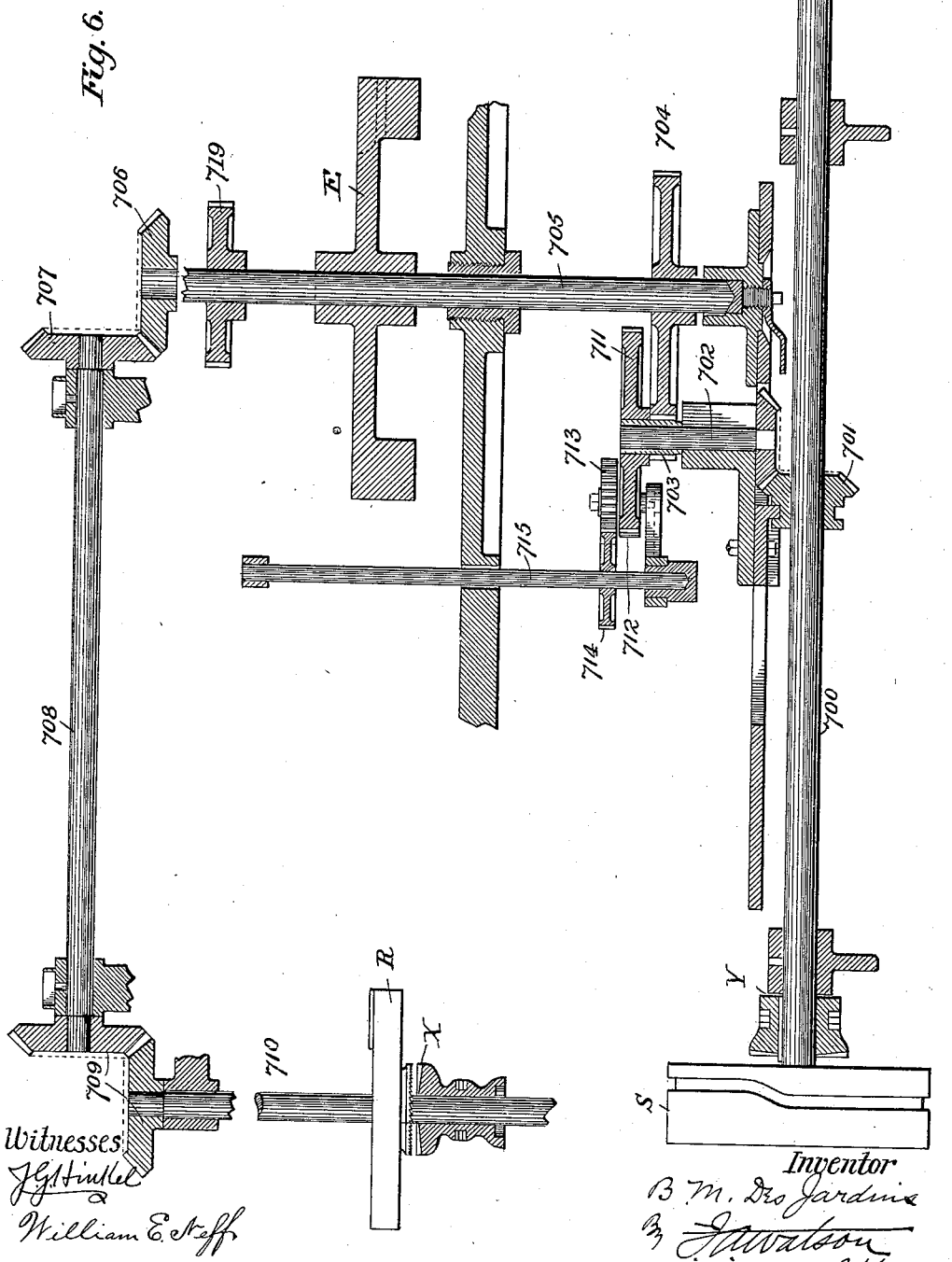
Figure 7:
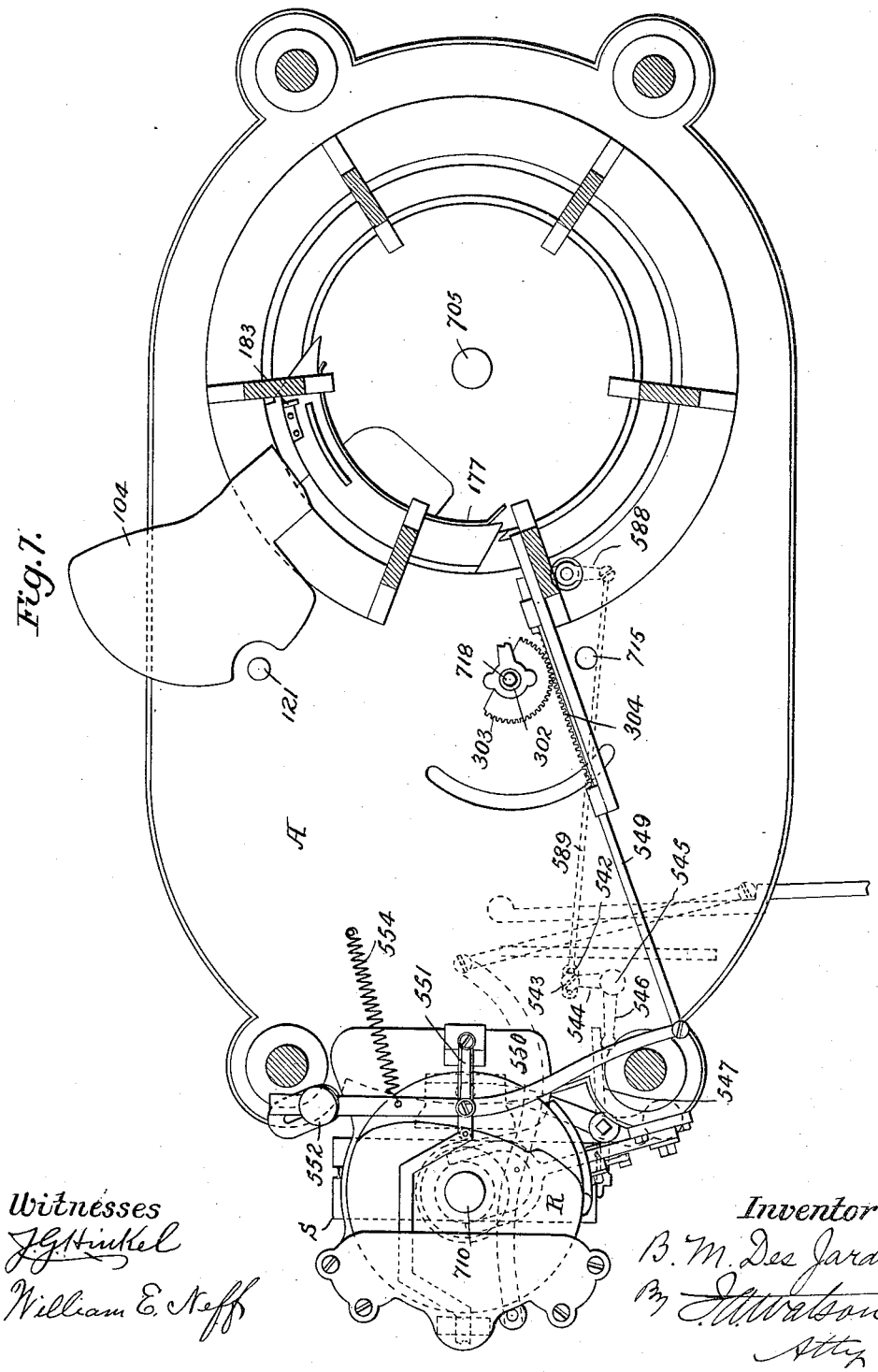
Figure 8:
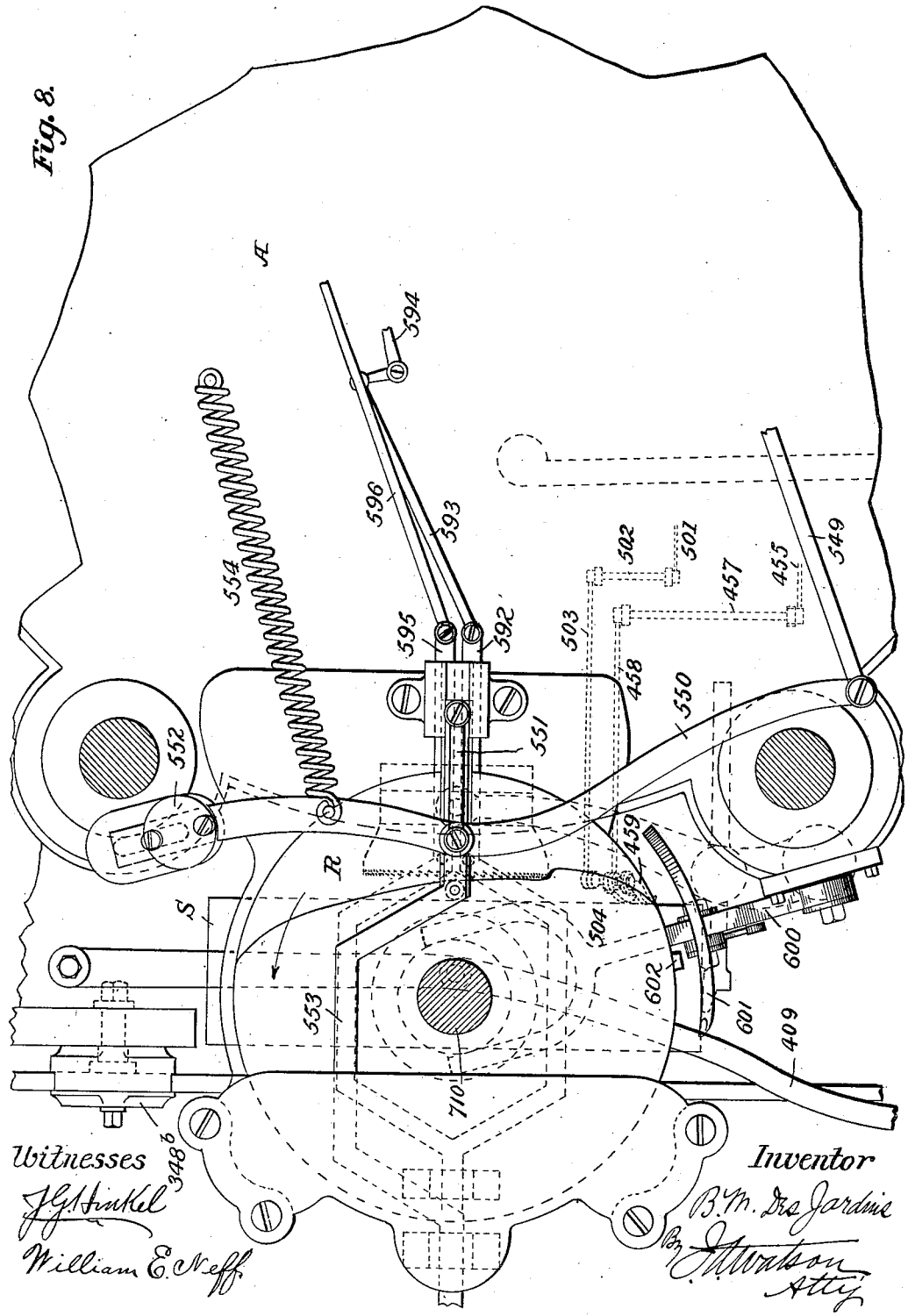
Figure 9:
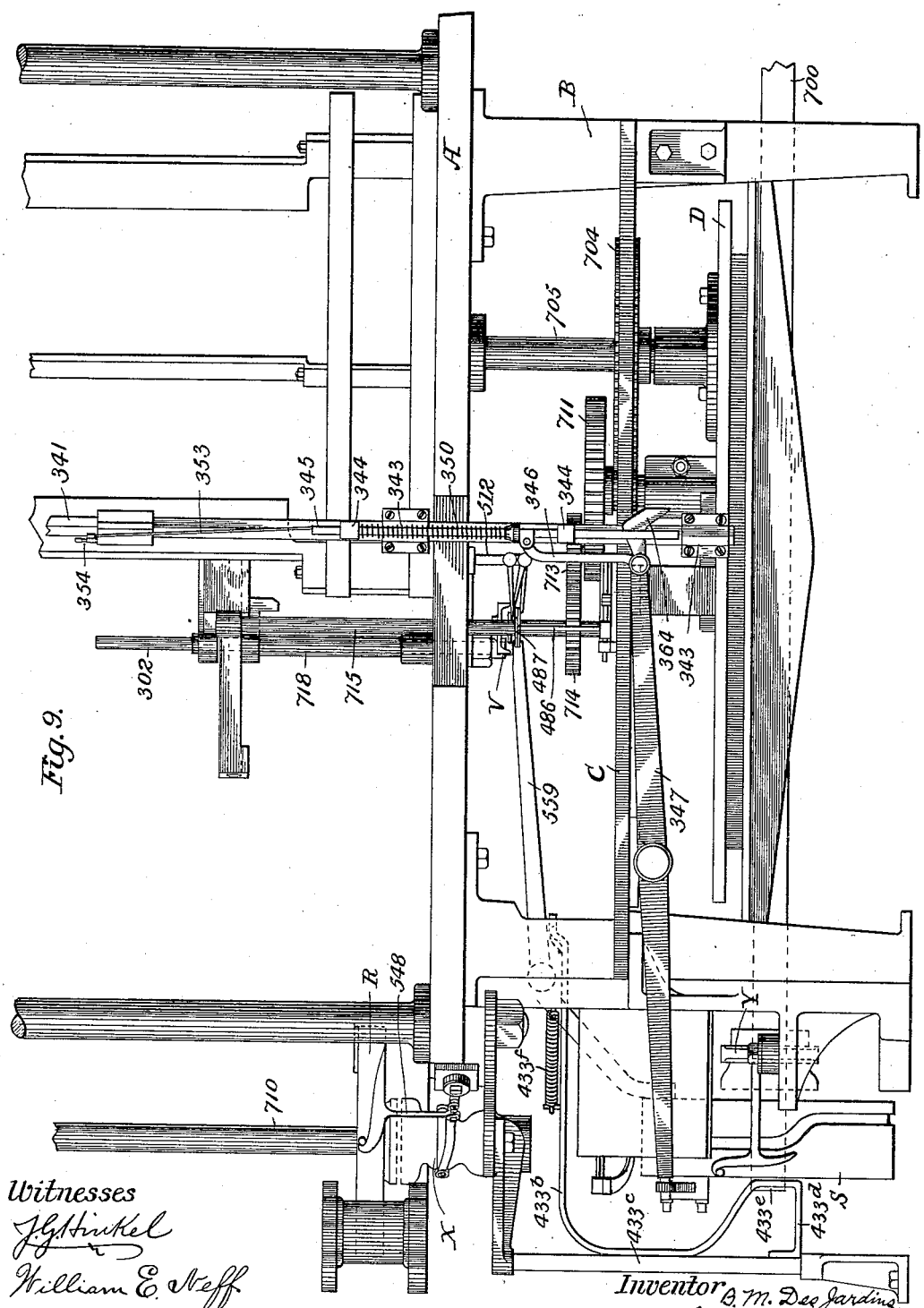
Figure 10:
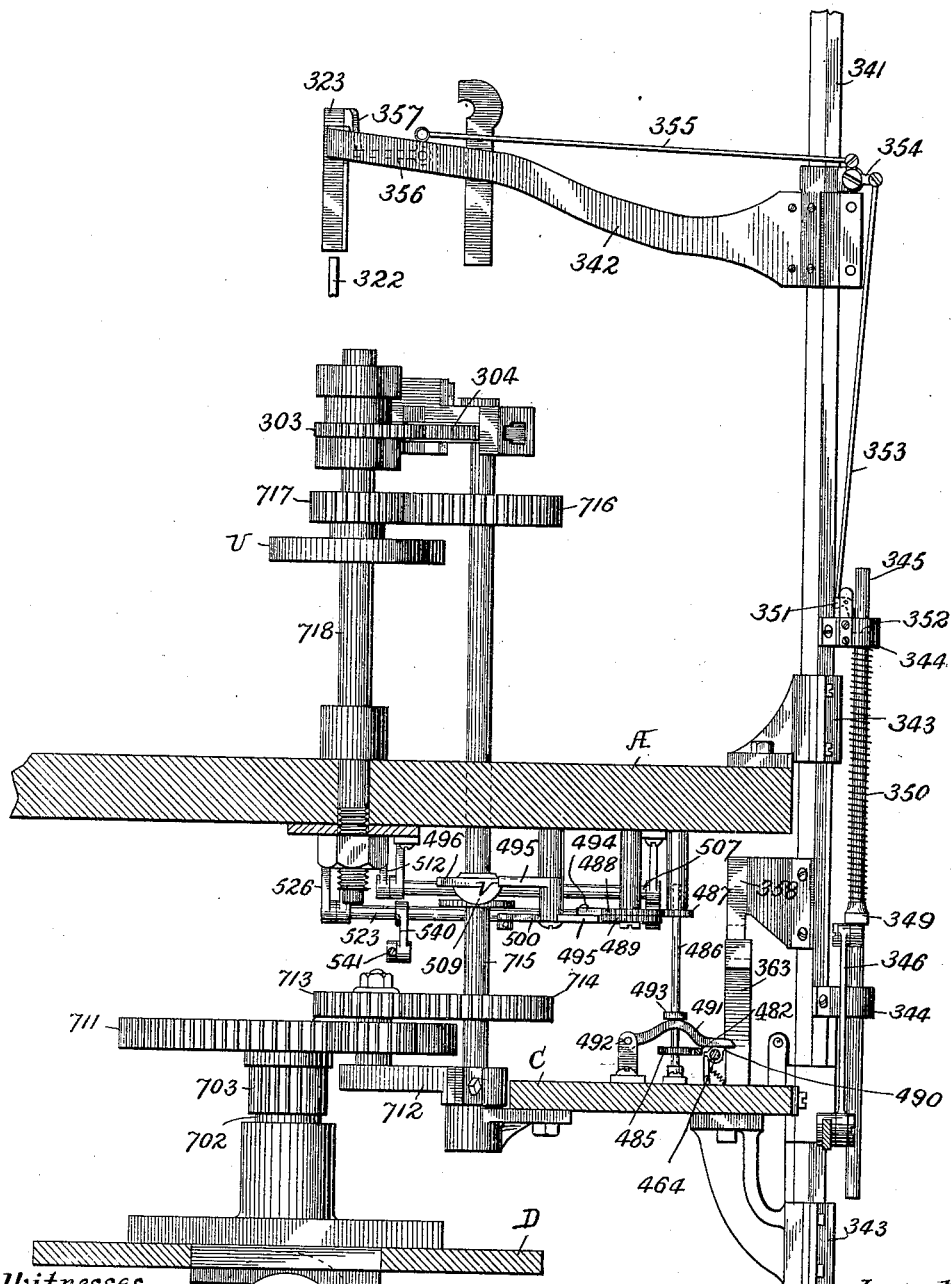

In the accompanying drawing Figure 1 is a front elevation of the machine partly in section on the line 1—1, Fig. 2; Fig. 2 is a right side elevation, the upper part being broken away; Fig. 3 is a plan view partly in section on the line 3—3 of Fig. 2; Fig. 4 is a sectional plan view on the line 4—4 Fig. 2 illustrating the computing devices; Fig. 5 is a partial front elevation; Fig. 6 is a diagram showing the main shafts and gearing; Fig. 7 is a partial sectional plan view showing the bed plate, etc.; Fig. 8 shows a portion of Fig. 7 enlarged and with additional details; Fig. 9 is a partial side elevation; Fig. 10 is a front elevation showing some details, including the line measuring and controlling devices; Fig. 11 is an enlarged plan view of the ribbon feeding devices and connected mechanism; Fig. 12 is a side view of the parts shown in Fig. 11 looking in the direction of the arrow 12; Fig. 13 is a similar view looking in the direction of the arrow 13, Fig. 11; Fig. 14 is a similar view looking in the direction of the arrow 14, Fig. 11. Fig. 15 is a radial section through the type carrier wheel, magazine and coöperating devices; Fig. 15$^a$ is a detail view of the ejecting slide; Figs. 16 and 17 are side and edge views of a type transferring device; Fig. 18 is a bottom plan view of one of the keys; Fig. 19 is a side view of the same with the side wall removed; Fig. 20 is an end view of the same; Figs. 21 to 24 inclusive are details of one of the keys; Fig. 25 is a plan view illustrating one of the type carriers; Fig. 26 is a side view of the parts shown in Fig. 25, partly in section on the line 26, Fig. 25; Fig. 27 is an end view of the type carrier, the parts being shown inverted; Fig. 28 is a section on the line 28, Fig. 26; Fig. 29 is a side elevation of one of the locks which control the type magazine; Fig. 30 is a reverse side view of a portion of Fig. 29; Figs. 31 to 37 inclusive are details of the lock; Fig. 38 is an enlarged plan view illustrating the type discharging devices; Fig. 39 is an enlarged front view illustrating said devices; Fig. 40 is a sectional detail of part of Fig. 39, on line 40; Fig. 41 is a plan view illustrating the line receiving mechanism; Fig. 42 is an elevation illustrating the line receiving mechanism and surrounding parts; Figs. 42$^a$ and 42$^b$ are details; Fig. 43 is a plan view showing the line justifying channel at its position when receiving the line from the type setting machine; Fig. 44 is a similar view showing the parts in position to insert the justifying spaces in the line; Fig. 45 is a similar view showing the parts in position to transfer the line to the galley; Fig. 46 is a sectional elevation through the space inserting devices; Fig. 46$^a$ is an elevation of one side of the justifying channel; Figs. 47, 48 and 49 are details of the chute through which the separators are discharged; Fig. 50 is an elevation of the receiving galley; Fig. 50$^a$ is an end view of the same; Fig. 51 is a front elevation of parts shown in Fig. 44, partly in section on line 51; Fig. 51$^a$ is a detail; Fig. 52 is a right side elevation showing the devices for communicating the measurement of the line to the justifier; Fig. 52$^a$ is a detail of the controller; Fig. 53 is a plan view of the computing devices; Fig. 53$^a$ is a section on the line $a$ Fig. 53; Fig. 53$^b$ is a detail; Fig. 54 is a detail of part of Fig. 53; Fig. 55 is a side elevation of parts illustrated in Fig. 53; Figs. 55$^a$ and 55$^b$ are details; Fig. 56 is a plan view of parts of the justifier including the devices for counting the separators and the difference and controlling devices; Fig. 56$^a$ is a detail of part of Fig. 56; and Fig. 57 is a section on line 57, Fig. 56.

*Type setting mechanism.*—The type are contained in channels which are arranged in the arc of a circle. Concentric with the magazine is a carrier wheel which revolves continuously, said wheel being provided with a series of carriers which travel under the magazine channels and take the type from said channels and deliver them to the assembling channel. The carrier wheel revolves continuously, the type being transferred to it and taken from it while it is in motion. The carrier wheel contains a series of type selecting keys, one for each type carrier. At one point in the revolution of the carrier wheel the keys are set to select different type by means of a setting mechanism which in the present case is controlled by a perforated strip. Each key is set as it passes the setting devices and on its succeeding revolution it operates the lock of the channel for which it is set and discharges the type therefrom, which type is taken from the carrier and delivered to the assembling channel. In this manner the type are assembled very rapidly and smoothly owing to the continued movement of the setting wheel.

The various parts of the machine are mounted upon a suitable frame work. As shown the frame consists chiefly of a base plate A mounted upon legs B and secondary base plates C and D suitably connected to said legs.

The matter to be composed is first represented by perforations or combinations of perforations in a strip of paper or by some equivalent device. I have found the perforated strip most convenient for this purpose. The mechanism for preparing the perforated strip does not form a part of the present invention. Such mechanism however is shown in prior patents and is well known to those skilled in the art.

Referring to Figs. 1 and 3, and more particularly to Figs. 11 to 14 inclusive, 100 indicates a perforated strip constituting a preliminary representation of the matter to be composed. This strip is provided with combinations of perforations in transverse rows adapted to control the selection of the type, and temporary word separators of uniform width. The strip as shown is carried by a spool 101 mounted on an arm 102 which is pivoted at 103 to a plate or bracket 104 mounted on the main frame above the base plate A. The strip 100 is carried over a brake lever 105 to a feed roller 106 provided with pins or projections 107 adapted to engage perforations in the strip to draw it forward. The lever 105 is pressed yieldingly against the paper strip by means of a spring 108 wound about the pivot 109 of the lever and having its tension regulated by a ratchet 110 and pawl 111. The lever 105 bears against the perforated roller 106 carrying the paper into close engagement therewith. The spool 101 is pressed against the opposite end of the lever to create tension on the paper strip by means of a spring 112, the tension of which can be regulated by a ratchet 113 and pawl 114 (Fig. 11).

Mounted on the axis of a feed roll 106 is a swinging arm 115, carrying a spring pawl 116 which engages a ratchet 117 connected with the feed roll. A holding pawl 118 also coöperates with the ratchet to prevent backward movement of the roll. The arm 115 is operated by a link 119 and arm 120 on a rock shaft 121. The rock shaft 121 is rocked by means of an arm 122 and a link 123 connecting the arm with a crank pin 124 on a rotating gear 725. (Figs. 1 and 3.)

The feed roll 106 is mounted in a pivoted frame 125, the free end of which is held in a latch 126. The frame may be raised to permit of inspection of the feelers which coöperate with the perforated strip. The strip passes around the feed roll in the direction of the arrow until it reaches a stripper 127 after which it passes into any suitable receptacle. To the frame 125 is connected a brake device having two adjustable brake shoes 128 which bear upon the feed roll to stop it immediately upon the stopping of the arm 115. The pressure of the brake shoes can be adjusted by means of screws 129. (Fig. 14.)

In suitable brackets 130 upon the plate 104 are mounted a series of slides 131 adapted to slide in a line intersecting the axis of the feed roll 106 (Figs. 11 to 14 inclusive). To each slide 131 a lever 132 is pivotally connected at 133. The lever 132 has an arm 134 for a purpose to be hereinafter described. Resting pivotally upon each of the levers 132 is a feeler 135, the opposite ends of the feelers being adjacent to the feed roll 106 and adapted to enter openings 136 in said feed roll when the perforations in the strip 100 permit. An adjustable brake shoe 137 (Fig. 11) tends to hold the slides 131 frictionally in any position into which they may be moved. The slides are moved periodically to the right, directions being assumed with reference to Fig. 11, by means of an arm 138 which engages a shoulder 139. The arm 138 is rocked about a shaft 140 by means of an arm 140ª which has pin-and-slot connection with a link 141 connected to an arm 142 on shaft 121. A spring 143, the tension of which is adjustable by means of a ratchet 144 and pawl 145, tends to throw the arm 138 away from the feed roll and keep the pin in the inner or right end of the slot in link 141. As the slides 131 are moved to the left the feelers which do not enter holes in the strip 100 are stopped by the strip and forced backward relatively to their slides thereby throwing the lever arms 134 out into the path of the arm 138. At this moment the reverse movement of shaft 121 throws arm 138 inward toward the center of the machine striking the arms 134 which are projected and carrying their slides inward toward the keys.

When the arm 138 moves to the left a lever 650 bearing on shoulders of the slides returns them to their normal positions. The lever 650 is normally pressed against an adjustable stop 651 by a spring 652 the tension of which may be regulated by a ratchet 653 and pawl 654. Connected to the inner end of the plate 104 are a series of elbow levers 146 pivoted on a stud 147. These levers have ends 148 adapted to be thrown into the paths of the slides 131 and to be stopped by such slides as have been moved inward by the arm 138. The arms 148 of the levers 146 are normally thrown into the paths of the slides 131 by means of springs 149 and they are periodically moved out of said paths by a pin 150 on a lever 151 mounted on the pivot pin 147, as will be hereinafter described. The arms 134 of levers 132 are periodically restored to their normal positions out of the path of arm 138 by means of a plate 152 normally carried by a pivoted lever 153 which has a spring 154 on its back, said spring lying in the path of rollers 155 carried by disks 156. (Figs. 11 and 13.) Upon one of the disks is a series of pins 157 by means of which the disks are rotated step by step, the pins being engaged by a spring pawl or lever 158 upon an arm 159 of rock shaft 121. The levers 146 have projections 160 which lie in the paths of rollers upon the keys and the lever 151 has a projecting end 161 which lies in the path of a roller upon each of the keys as will be hereinafter described.

Upon the periphery of the carrier wheel E are mounted a series of keys F, two of which are shown in Fig. 11. In each of these keys is mounted a series of slides 162 (Figs. 18 to 24 inclusive) each slide being provided at its outer end with a roller 163. These slides are mounted in combs 164, 165 supported between side pieces 166. Each of the slides 162 is provided with a locking projection 167 which projection stands normally between similar projections 168 upon a locking plate 169. The plate 169 has a projection 170 which at the proper point in the revolution of the wheel E contacts with a fixed piece 183 (Fig. 7) to move the locking plate slightly to one side bringing the projections 168 in line with the projections 167 and locking the several slides 162 in whatever positions they may be. A series of springs 171 arranged between projections 172 on the slides 162 and a comb 173 serve to move the slides outward when the comb is moved out. The comb is moved out at the proper time in the revolution of the carrier wheel by the engagement of a pin 174 on said comb with a cam 177 (Fig. 7). The comb 173 and pin 174 are united to the sliding back plate 175 as indicated in Figs. 22 and 24.

As the carrier wheel E revolves a roller 176 carried by a key on a fixed bearing contacts with the cam shaped end 161 of lever 151 rocking said lever and causing the pin 150 to positively bring all of the elbow levers 146 into the position shown in Fig. 11 in which their arms 148 are out of the path of the feeler slides. While the roller 176 is still in contact with cam 161, the shaft 121 (Fig. 11) is rocked and the feeler slides 131 which do not correspond to perforations in the strip are carried positively downward by the arm 138 until their lower ends are below the arms 148. The roller 176 then passes off of the cam 161 which frees the lever 151 and such of the levers 146 as are not intercepted by the feeler slides. As the wheel E continues to revolve the rollers 163 on the next forward key engage the inclined surfaces of the lower arms 160 of levers 146, the levers corresponding to perforations in the paper will be free to swing out of the path of their corresponding rollers 163, while the levers corresponding to the feeler slides which have been moved inward will be locked by said feeler slides and will push inward their corresponding slides 162 in the key. Before the rollers 163 leave the incline of arm 160 the locking plate 169 is shifted and the key slides 162 located in the positions to which they have been adjusted. It therefore follows that each key is set and locked with those slides and rollers projecting which correspond to a transverse row of perforations in the strip representing a character or space to be selected. These projecting slides in the keys are afterward brought into action to select characters as will be hereinafter described.

As each key F passes the lock G (Fig. 15) which it is set to operate, a movable part of the lock which will be hereinafter described moves inward a slide 178 bringing a cam projection 179 on said slide into position to operate the locking slide 169 in the reverse direction to unlock the key slides. Immediately afterward the cam projection 180 on the key engages an incline 181 on slide 178 and returns it to its normal position. In this manner the slide 178 only comes into action when its corresponding lock is operated by a key properly set. Other keys are permitted to pass the slide 178 without being affected by it. There is a slide 178 for each lock G and they are mounted upon a fixed ring 182 (Fig. 15).

The detailed construction of the locks G is illustrated in Figs. 29 to 37 inclusive. Each of the locks has an outer fixed casing 184 in the inner flange of which are a series of slots forming a comb 185 in which are mounted a series of slides 186 having projecting beveled or rounded ends 187. The slides 186 have notches 188 which are differently placed so that when the cam ends of the slides are in line some of the notches are out of line. The inner ends of the slides 186 are mounted in a comb 189 carried by a movable frame 190 and the slides are each provided with a spring 191 between the comb 189 and the shoulder 192 on the slide. A special slide 193 in each lock is connected by an arm 194 with a lever 195, the opposite end of which lever is connected to the frame 190. The spring 196 normally throws the special slide inward and the frame outward. A lug on the frame 190 is pivotally connected to the lever 195 at 197. The slides 186 and 193 have their ends normally in the path of projected key slides 162. An extra slide 198 has a cam face 199 which stands normally in the path of the special key roller 176. Slide 198 carries a spring 200 which bears upon the forked end 201 of a lever 202 which has a long arm 203 for a purpose to be hereinafter described and a short arm 204 which is bent and projects through a slot 205 into engagement with a slide 206. (Figs. 29, 30 and 34.) Slide 206 has a series of teeth 207 which are opposite notches 188 when said notches are all brought into line. The forked end 201 of the lever 202 operates one arm of a lever 208. The other arm of said lever passes through a slot in a slide 209, (Fig. 30) the function of which slide will be stated hereafter.

The operation of the lock G is as follows: The roller 176 of each key as it passes operates the cam 199 and compresses spring 200, tending to operate the lever 202. Said lever however is prevented from moving by slide 206 which normally is locked by one or more of the forked slides 186. The notched slides 186 are normally held out of the path of the projected key rollers 163 by spring 196. The special slide, however, 193 is normally projected and if the corresponding key roller 163 is projected in a key it will engage said slide and through the lever 195 move the frame 190 and all of the slides 186 forward into position to be engaged by the remaining projected rollers 163. It follows from this arrangement that the lock will not be operated excepting by a key having a roller projected which will operate the special slide 193. In this way the locks are divided into as many groups as there are slides in one of the keys, ten being the number illustrated. The slide 193 may be termed the "master slide" of the lock. Any one of the slides may be selected for the master slide and suitably connected to the lever 195. When the master slide is moved in the slides 186 will be thrown out excepting such slides as are opposite projected rollers of the key. If the lock represents the letter "A" for instance and the key is intended to select the said letter the slides 186 will be adjusted by said key in the manner above described so as to bring the notches 188 in the slides into line and thus release the notched bar or comb 206 and permit the compressed spring 200 to operate the lever 202. The arm 203 of said lever is then given a sudden movement which serves to eject a type as will be hereinafter explained. The slide 209 thrown out by the movement of lever 208 moves the cam piece 178 (Fig. 15) into position to operate the locking slide 169 by engagement with its lock 170 and thus unlock the key slides 162. The fixed cam 180 (Figs. 18 and 19) then comes into operation and returns the slide 178. As soon as the lock G passes its key F the parts are all returned to their normal positions by the several springs of the lock.

I shall now proceed to describe the devices for removing the type from a channel of the magazine and inserting it into one of the carriers of the carrier wheel.

Referring to Figs. 15 and 25 to 28 inclusive, H indicates one of the carriers of the carrier wheel and I the magazine, the latter being composed of a series of channels 210 containing type 211. The bottom type lies in an open notch in an ejecting slide 212 which has two inclined slots 213 engaged by pins 214 connected to the base of the magazine. The arm 203 of the lock lever when operated strikes a sliding plate 215 which carries a spring 216 abutting against the end of slide 212. The slide 212 is thus moved inward and forward carrying the bottom type out of the magazine. This movement is only started by the lever arm 203 and is afterward completed as a positive movement imparted by a cam on the carrier wheel. The plate 215 is connected by a bar 217 to a block 218 carrying a pin 219 (Fig. 15). This pin normally stands out of the path of cam slots 220 (Fig. 25) on the carrier wheel. When, however, the pin is partially driven over by a blow from the lever arm 203 it enters a cam slot 220 and the slide 215 is positively drawn in and then forced out again by said cam. There is a cam slot 220 for each of the carriers of the carrier wheel.

Standing normally opposite the lowest type in each channel is an opening between the jaws 221 and 222 of a transferring device J. (Figs. 15 to 17 inclusive). The upper jaw 222 is normally pressed toward the lower jaw by a spiral spring 223 and is normally held from the lower jaws by an incline 224 on a horizontal slide 225 carried by a vertical slide 226. The slide 225 is operated at the proper moment by a pin 227 which extends through an opening 228 in the plate 215. The opening 228 is L-shaped to permit the pin 227 to have both a horizontal and a vertical movement. The slide 212 carries the bottom type out of the magazine channel and between the jaws 221 and 222 of the transferring device. At the moment it reaches a position between said jaws the end of slot 228 strikes the pin 227 thus moving the incline 224 and releasing the upper jaw 222 and the type is thereupon firmly grasped between the jaws 221 and 222.

Upon the slide 226 is a pivoted lever 229, the outer edge of which is arranged to be engaged by the plate 215. The inner edge carries a stepped projection 230 which at the proper moment is pushed into a cam slot 231 in the outer face of the carrier H (Fig. 27). This cam slot through the medium of lever 229 carries the slide 226 down to transfer the type from the magazine to the carrier, to be presently described, and then carries said slide up again, an incline 232 at the end of the slot 231 serving to throw the lever 229 out to its normal position. During the passage of projection 230 through the slot 231 it operates a cam 233 at the upper side of said slot and a cam 234 at the lower side of said slot, which cams will be alluded to hereafter—see Fig. 27 which shows the parts inverted.

The downward movement of the type transferring device lands the type with its ends on fixed supports 235 on the carrier H. At this moment the plate 215 moves outward carrying with it the pin 227 and raising the upper jaw 222, thus releasing the type from the transferring device. At the same instant a pair of clamps 236 (Figs. 25 to 28 inclusive) are lowered onto the type clamping it on the supports 235. The clamps 236 have stems which pass through the frame of the carrier H. These stems are surrounded by spiral springs 237 and a spring tension is put upon the clamps by an angular plate 238 which engages the springs. The stems of clamps 236 have shoulders which rest on the plate 238 and by means of which the clamps are raised. The plate 238 is connected by a pin and slot to the cam 233 which is operated by one of the shoulders on the projection 230.

Simultaneously with the above operation of clamping the type in the carrier, two pairs of pivoted side clamps 239 are brought up to confine the type sidewise on the supports 235. These side clamps 239 are pivoted at 240 and a U-shaped spring 241 is adapted to hold them either in their open or closed position. (Fig. 28). The side clamps are operated by sliding rods 242 having bearings in the finger frame, said rods being connected to a plate 243 which is operated by the cam 234, the cam being operated by a shoulder on the projection 230 of the transferring device. The sliding rods 242 are connected to the side clamps by a suitable pin-and-slot connection 244.

A roller 245 is mounted on the upper end of a rod 246 sliding in the carrier frame. Rod 246 has a shoulder which rests on the plate 238 and the rod and roller are raised in proportion to the thickness of the type carried, the shoulder on 230 which operates the cam 233 being the gage of such thickness. The rod 246 is held frictionally by a spring plunger 246$^a$ (Fig. 26) and while it is in action releasing the type, as will be hereinafter explained, it is firmly clamped by means of a cam 247, lever 248, slide 249 and roller 250, (Figs. 25 and 26), said roller engaging a cam slot 251 at the time the type is discharged from the carrier to the receiving channel or stick.

The devices above described receive the type from the transferring device and clamp it in a type carrier while the carrier wheel is moving. It is to be understood that in this machine the carrier wheel revolves continuously at a uniform speed and that the operations of transferring type to it and taking them from it are performed with such rapidity as to insure perfect action notwithstanding the wheel is in motion.

The carriers transport the type from any one of the magazine channels to a line assembling channel or "stick" K. This stick is a vertical channel extending over the path of the type as they are carried around by the carrier wheel. The type in the stick K are normally supported at a point 252 on the end of a slide 253 connected to an arm 254, (Figs. 38 and 39) upon a rock shaft 255. The rock shaft is operated by a cam lever 256. The arm 254 is in the form of a box in which the slide 253 works. The slide 253 is provided with a rack 257 meshing with a sector gear 258 upon a shaft 259 rocked by an arm 260, the arm 260 being operated by a fixed projection 261 upon the carrier frame. (Figs. 27 and 39.) Connected to the slide 253 is a second rack 262 which is operated by a sector gear 263, rock shaft 264, arm 265 and a fixed projection 266 on the finger frame. (Figs. 27 and 39.) The cam arm 256 is operated by roll 256$^a$ on the finger frame.

As the type carriers near the point of delivery 252 projecting pins or rollers 267 on the backs of the clamps 236 ride over lever arms 268 and at the proper time the lever arms are rocked by a connected lever 269 (Fig. 38) and roll 245. This roll, as previously explained, is adjusted to the thickness of the type carried and this is to regulate the lifting of the clamps and prevent them from being raised sufficiently to permit the type to be overturned. As the type reaches the releasing point it is stopped by a fixed projection 270, the clamps 236 are released as above described, the side clamps 239 are released by a cam projection 271 (Figs. 27 and 39) coming in contact with a fixed part 272 (Fig. 39) and the type is sustained upon the end of a lever 273 having cam surfaces 274 and 275. The slide 276 connected to lever 277 (Figs. 38 and 39) drops down in the rear of the type to prevent displacement and guide the type to the stick. The lever 277 is operated by roller 256$^a$. One of the rollers 278 (Figs. 26 and 27) now engages cam 274 raising one end of lever 273 and lifting the type from the finger up to the supporting slide 253. At this moment the arm 260 is operated and the slide 253 withdrawn, the cam roll 256$^a$ then strikes a cam projection 279 raising said cam and lowering the slide 253 beneath the level of the type. The arm 265 is then operated by projection 266, which carries slide 253 under the type and the cam roll 256$^a$ then runs from under the cam 279 and another roll 256$^a$ raises the opposite end of lever 256 (Fig. 39) and rocks the shaft 255 thereby raising the slide 253 to its normal position and adding the new type to the line. At this point a roll 278 strikes cam 275 and lowers the end of 273 into position to receive another type. It will be understood from an inspection of Figs. 38 and 39 that the rolls on several of the carrier fingers operate to bring about the movements necessary to release a single type from one of the carriers and remove it to the stick. The carrier fingers are arranged in a continuous series about the carrier wheel and evenly spaced so that the movements above described are always properly timed.

The assembling type channel K (Figs. 42, 42ᵃ and 42ᵇ) consists of an angular fixed bar 280 forming one side and part of the back of the channel, the fixed plate 281 forming part of the back of the channel, two movable bars 282 and 283 forming a partial front for the channel and adapted to retain the type therein, and a movable side bar 284 forming the remaining side of the channel and adapted to be reciprocated slightly to line up the type therein. The side plate 284 is T-shaped, having a stem 285 which is loosely engaged with the lever 286 (Fig. 42), the other end of the lever being engaged by a cam groove in cam wheel T.

The front plates 282, and 283 are L-shaped, their horizontal portions, 288 and 289, being provided with rack teeth in mesh with sector gears 290 and 291 respectively. These sector gears are provided with intermeshing teeth which cause them to oscillate in opposite directions at the same time. The sector 290 is also provided with a sector gear 292 in mesh with a rack 293. The rack 293 has a projection 294 fitting loosely between two brackets 295 on a slide 296 (Fig. 42). Slide 296 carries a roll 297 which normally engages a circular groove 298 on cam wheel T (Fig. 41). After a line is assembled the slide 296 is moved slightly by means which will be hereinafter described and the roll 297 engaged with a branch cam groove 299 thereby imparting movement to the slide 296 and through the connections described to the side plates of the channel K.

From the assembling channel K the line of type is transferred to a justifying channel in which the line is transported first to the respacing devices and afterward to the galley. The justifying channel L is carried by an arm or frame 300 on a sleeve or hollow shaft 718 which is mounted on a vertically moving shaft 302. The arm 300 is periodically rocked by means of a gear 303 and rack 304, as will be hereinafter explained, to carry the lines of type from the assembling channel to the spacing devices and the galley (Figs. 42 to 45 inclusive). The justifying channel L comprises two movable rear bars 305, 306 which, when the channels K and L are brought together, are connected with the front bars 282, 283 by dowel pins 307. The front bars 308 are fixed relatively to the arm 300 and the type are confined endwise between a plunger 309 and a pivoted gate 310, the latter being controlled by a lever 311 as will be hereinafter explained.

At the back of the assembling channel K is a line shifting device comprising a pair of vertical bars 312 (Fig. 40). These bars are connected to opposite sides of a head 313 and they are moved laterally to force the type from the assembling channel into the justifying channel after each line is assembled by means of connections comprising a two-armed lever 314 and a slide 315 which carries a pin or roller engaging groove in the cam T (Figs. 39 to 42 inclusive). When the line is completed in the assembling channel the justifying channel is moved against the assembling channel and their adjacent sides engaged by means of the dowel pins 307. These adjacent sides are then withdrawn and the line is transferred from the assembling channel to the justifying channel by means of the line shifting bars 312. To prevent the line from becoming pied a pair of bars 316 are carried by the justifier channel and are compressed into engagement with the line of type by the spring 317 just before the sides 282 and 283 are withdrawn. While being transferred the line of type is therefore confined between the bars 312 and 316. Just as the line reaches its proper position in the justifying channel a pin 318 connected with the bars 316 is engaged by a catch 319. The bars 282, 283 are then returned bringing back the sides of the justifier channel and engaging the type so that the line is confined in the justifier channel. The bars 312 are then withdrawn and the justifier channel is free to carry its line to the spacing devices while the assembling channel is ready to receive the type of a new line.

*Justifying mechanism.*—The justifying mechanism comprises two principal elements or members, one of which takes the measurement of the line of type, ascertaining the shortage to be filled, while the other member is governed by the number of word spaces in the line into which the shortage is to be distributed. These two members of the justifying mechanism operate upon common devices which are set in accordance with the resultant of the movements of these primary members and which in turn control the selection of spaces to justify the line. I shall first explain the line measuring member, which consists of a number of connected parts.

*Line measuring devices.*—Adjacent to the assembling channel K is a post 320 on which rides a weighted block 321. The block 321 is raised gradually by the type as the line is assembled, resting on the leading type in the channel. Carried by the block 321 is a post or extension 322. (Figs. 10, 42ᵃ and 42ᵇ). Over the post 322 is a sliding block 323 which rests upon post 322 when the line of type in the channel K is full or nearly so.

The perforated strip is provided with perforations to select the type for a line, perforations to select temporary separators for the words, and at the end of each line a perforation or perforations which indicate the termination of the line. These line perforations adjust one of the keys which in turn operates a lock and shifts a slide 215$^a$. This particular slide operates on a crank pin 324 (Fig. 41) and rocks a shaft 325 which operates another slide 215$^b$ and rocks a shaft 326. This shaft is connected by crank arm 327, link 328, arm 329, rock shaft 330, and arm 331 (Figs. 39 and 41) with a movable slide 332 having a foot 333 which is adapted to pass under and lift the line of type in the assembling channel. As soon as the line is completed the devices just enumerated are brought into operation and the line is lifted on the foot 333 until the bottom of the line is at a fixed point from which the measurement of the line is taken. After the foot 333 is raised the block 323 is clamped firmly in its adjusted position by an eccentric 334 on rock shaft 335 which is rocked by the engagement of its arm 336 with a hook 337 carried by an arm.

On the right side of the machine is a vertical angular sliding bar 341 which I will term the measuring bar, to which is rigidly connected a measuring arm 342. (Figs. 1, 10, 41 and 52.) The bar 341 slides in suitable bearings 343 and the outer end of its arm 342 extends under a shoulder on the sliding block 323. The position of said block after it is adjusted upon a complete line of type determines the adjustment of the measuring bar 341. The bar 341 carries bearings 344 in which slides a rod 345 which is connected by a link 346 to a lever 347 which is moved on its fulcrum 348 for the justification of each line by lever 348$^a$ mounted in bearing 348$^b$ and operated by groove in cam S (Figs. 4 and 5). Between a collar 349 on rod 345 and the upper bearing 344 of said rod is a suitable spring 350. Pivoted to the upper bearing 344 is a pawl 351 which engages the upper side of a collar 352 fixed on the rod 345. When pawl 351 engages the collar the bar 341 is positively moved upward by the rod 345. When the measuring arm reaches the block 323 however the pawl is withdrawn from collar 352 by its connections, rod 353, elbow lever 354, rod 355 and elbow lever 356. One arm of said elbow lever 356 engages the arm 357 on block 323 (Figs. 10 and 41). After the pawl 351 releases the collar 352 the measuring arm is carried up slightly until it is checked by the block 323 and thereafter the rod 345 rises independently of the bar 341 compressing the spring 350. The height to which the bar 341 rises therefore is determined by the length of the line under measurement. The bar 341 carries a bracket 358 (Figs. 10 and 52) having depending lugs 359 through which slides a rod 360, connected to lugs 361 upon a plate 362 having an angular face 363. This angular plate 362 is adjusted by the line measuring device and also by the space counting device, to be presently described, and is an element of the justifier common to both devices, its object being to eliminate the separators from the measurement of the line. In order to lock the measuring bar and the angular plate 362 to prevent them from being dislodged during the subsequent operation of the justifying devices, the lever 347 is provided with an inclined extension 364 which as the measuring bar reaches its highest position strikes an arm 365 and rocks a shaft 366 on which is a cam 367. This cam engages a block 368 which bears upon the bar 341 and locks the bar rigidly in place until the lever 347 descends.

*Word space counting devices.*—The locks representing the separators operate upon a sliding plate 215$^c$. It has a notch 369 in which loosely fits the end of an arm 370 of a sleeve 371. (Fig. 56.) Upon sleeve 371 is an arm 372 to which is connected a slide 373. (Fig. 56.) The end of this slide has a pin which travels in a cam slot in a bracket 375, which cam raises the slide to bring a pin 376 into contact with a lever 377 when the shaft 371 is rocked in one direction. When the shaft is rocked in the other direction the pin 376 is lowered so that the lever 377 may swing over it for a purpose to be explained hereinafter. Lever 377 is normally drawn forward (Fig. 56) by a spring 378. On its shorter arm it carries a spring pawl 379 which is the moving pawl of a word counting rack 380$^b$ located below the stop rack 380 and integral therewith. The rack 380$^b$ is also provided with a holding pawl 381 pivoted at 382 and connected by a pin-and-slot connection to one end of a link 383, the opposite end of which is pivotally connected to the lever 377. When the lever 377 is drawn forward to the extreme limit the moving pawl is released from the rack by a pin 384 and the holding pawl is released by the link 383. The forward end of the rack 380 carries a bracket 385 (Fig. 52) upon which is a rod 386, which rod also passes through lugs on the angle plate 362. The angle plate is therefore carried forward and back with the counting rack and at the same time permitted to travel up and down with the measuring bar.

The angle plate 362 is shown connected to the inside of the head 380$^a$ of the measuring bar. On the outside of said head at 387 is pivoted an abutment lever 388 having on its forward end an adjustable abutment block 389 (Figs. 52 and 56). The abutment block is connected to the lever by suitable screws which permit the position of the block to be delicately adjusted. The abutment lever is prevented from swinging on its pivot unduly by a fixed pin 390 passing through a slot in its rear end. The forward end of the lever is caused to swing down at certain times for a purpose to be explained hereinafter. It is connected to the angle plate by means of a rod 391 which passes loosely through a bracket 392 on the upper part of the plate. The rod 391 is connected to a stud 393 on the inside of the abutment lever and is provided above lug 392 with a head 394. A spring 395 surrounds the rod between the bracket 392 and the stud 393. It will thus be seen that the forward end of the abutment lever is pushed down yieldingly when the measuring rod and angle plate are lowered and pulled up positively when they are raised.

Referring to Fig. 53, 400 indicates what I shall term a "computing bar" pivoted to the frame at 396 and having an operative edge 397 in line with the center of the pivot. The free end of the bar has an edge or surface 398, in line with the edge 397, which edge 398 is engaged by a shoulder 399 on a rod 401 sliding in suitable bearings 402 on the frame. The edge 398 is held in contact with the shoulder 399 by means of a slide 402$^a$ and spring 403. The rod 401 carries on its rear end a head 404 adapted to contact with the abutment 389 of the counting rack when rod 401 is moved toward said abutment. The rod 401 is connected to a cross head 405 which carries a pivoted arm 406. Projection 407 on said arm stands normally in the path of a sliding rod 408 connected to an arm 409 (Figs. 3, 4, 5, 52 and 53) which arm is pivoted at 410 to the frame and periodically reciprocated by connection with a cam groove in the surface of cam wheel S. The lever 406 is normally locked with the projection 407 in the path of slide 408, as shown in Fig. 53, by a shoulder 411 on a rod 412 which is mounted in bearings on slide 401, said rod being normally pressed toward the rear by a spring 413. The rear end of rod 412 projects slightly beyond the head 404 of rod 401. (Fig. 52.) As the rod 401 is pushed rearward positively by the action of the cam, rod 412 comes in contact with abutment 389 and the spring 413 is compressed and lever 406 released from the shoulder 411. The lever is thereby permitted to swing carrying the shoulder 407 out of the path of the slide 408 thus permitting the head 404 to stop in contact with the abutment 389 while the slide 408 moves forward to the end of its stroke. The effect of this movement is to set the counting bar 400 in accordance with the number of separators in the line, which number governs the position of the abutment 389.

The T-slide 414 slides in the bearings 402 and has a right angled T-blade 415 rigidly connected and having its outer end sliding in a bearing 416. The right angled portion is for convenience of construction supported by a bracket 417. The slide 414 has a head 418 which carries a pivoted lever 419 similar to the lever 406. On the lever is a shoulder 420 against which a slide 421 connected to the lever 409 normally abuts. Lever 419 is prevented from turning by a shoulder 422 on a rod 423 mounted in bearings on the slide 414. The rod 423 is normally pressed rearward by a spring 424 (Fig. 53). On the forward end of slide 414 is a plate carrying an inclined surface 425, which surface is parallel with the surface 363 of the angle plate 362. On the forward end of bar 414 is an elbow lever 426 having one arm connected to the rod 423 (Figs. 52 and 53) and its other arm normally located slightly in advance of the inclined surface 425. The parts connected to the rod 423 constitute a trigger which releases the slide 414 from the slide 421 just as the slide 401 is released from the slide 408. This is effected by the arm of lever 426 coming in contact with the incline 363 just before the incline 425 comes in contact.

By the mechanism above described the computing bar 400 and the T-blade 415 are simultaneously adjusted in accordance with the shortage of, and the number of intervals in, an unjustified line of type. When this adjustment is completed the bars 401 and 414 are locked securely in position by a cam 427, (Figs. 53 and 53$^b$), said cam being operated by an arm 428, link 429, and cam lever 409, the link 429 having a pin-and-slot connection with the cam lever (Figs. 3, 4, 53 and 54). The slides 408 and 421 are provided with pins or shoulder 430 which engage bars 430$^a$ and by means of which the slides 401 and 414 are drawn forward after they are released from the clamping cam 427.

A gage block 431 slides in longitudinal guides 432 in the T-blade 415. Upon the gage block is a projection 437 through which slides a rod 433 parallel with the T-blade. The rod 433 is provided at one end with a collar 434 and at the other end with a head 436 and a spring 435 between said head and the projection 437. When a rod 433 is moved in one direction the gage block and its connected parts are carried along by the collar 434 which enters a recess in projection 437. On the return movement of the rod 433, which takes place after the T-blade and computing bar have been adjusted for a line of type, the gage block is carried along by the engagement of a hook 438 which is pivoted on the gage block with the collar 434. The rod 433 is reciprocated by a link 433$^a$ and cam lever 433$^b$ (Figs. 2, 4 and 5). The cam lever 433$^b$ is connected to a pivoted vertical post or rock shaft 433$^c$ and has an arm 433$^d$ which is held against a cam 433$^e$ on shaft 700 by a spring 433$^f$. The gage block carries a pin 439 which comes in contact with the operating edge of the computing bar. At the moment or just before this takes place the tail of the pawl 438 strikes the computing bar and releases the gage block from the collar 434, thus permitting the gage block to rest with pin 439 against the computing bar while the rod 433 moves on independently.

The position assumed by the gage block when the pin 439 engages the computing bar corresponds to a "normal" justifying space, that is, a space which is of the average width necessary to justify the line, or, in other words, a space equal to the shortage of the unjustified line divided by the number of separators or word spaces. The machine, however, is only provided with a few sizes of spaces and the justification is effected by inserting spaces of one size if there happens to be a size equal to the normal space required, or inserting spaces of two consecutive sizes. It usually happens that two sizes of spaces are required and the problem of justification is worked out by the machine as follows: The spaces selected and inserted in the first part of the line are of the size next to but smaller than the normal. If these spaces were used throughout the line there would be a shortage remaining to be filled. This shortage is taken account of by the machine automatically before the spacing begins by what I term the "difference devices", that is, the devices which compensate for the difference between the required measure of the line and the length the line would be if filled with the smaller spaces. The difference devices control mechanism which governs the selecting of the spaces by effecting a change from one size of space to the next larger size during the spacing of the line, a sufficient number of spaces of each size being inserted to justify the line to within half a unit of space, the unit being equal to the difference between two consecutive sizes of spaces.

Connected to the gage block is an arm 440 which carries a slide 441 running in guide rods 442. To the slide 441 is pivoted an arm 443 (Figs. 53 and 55) in which is carried a pin 444, said pin being normally held up by a spring 445 and being surmounted by a friction roller 446. On the arm 443 are two pins 447 which coöperate with a spring 448 to hold the arm in a certain normal position. The arm 443 has a limited pivotal movement in the slide 441. As the slide 441 travels on its guides 442, the pin 444 travels over a series of perforations 449 in a toothed bar 450 (Figs. 53, 53$^a$ and 55). Underneath the perforations 449 are the forward ends of a series of levers 451 the rear ends of which carry stop pins 452 which stop the justifying channel opposite the proper space channel in the space magazine to be hereinafter referred to.

The movement of the gage block heretofore specified locates the pin 444 over a tooth of rack 450 which corresponds to the first size required to justify the line and the pin is then driven down by an arm 453 carried by a slide 454, (Figs. 4, 5 and 55) which moves vertically in guides adjacent to the cam S and is operated by a groove in said cam. The pin 444 usually happens to be located between two of the perforations 449. The tooth between said perforations is inclined on one side and vertical on the other and when the pin encounters the tooth it always slides in the same direction until it reaches the perforation at the base of the tooth after which it passes through and operates one of the stop levers 451. To permit the pin to slide the arm 443 is pivoted in the slide 441 as above stated. The amount which the pin slides to reach a hole in the rack is proportional to the "difference" above mentioned. This backward movement of the arm 443 permits a corresponding backward movement of the gage block and a consequent looseness or opening between the gage pin 439 and the computing bar 400. This permits the T-blade to be moved forward an amount corresponding to the "difference" and this movement is effected and taken advantage of to control the difference devices which will now be described.

*Difference devices.*—A rod 455 (Fig. 56) is connected to an arm of a rock shaft 457 (Fig. 8) which rock shaft has a second arm connected by a link 458 to a cam lever 459 operated by the cam S. The rod 455 has a slot 460 through which passes a pin 461 on pawl lever 377. To the end of rod 455 is connected an elbow lever 462 which engages an arm 463 on a rock shaft 464 and serves to rock said shaft when rod 455 is moved forward to bring a pawl 465 into engagement with a tooth on the counting rack 380.

After the space magazine stop pin 452 has been located by the pin 444, as above described, and a looseness has been created between the counting bar and the gage block, the rod 455 moves rearward, under the influence of spring 472, carrying with it the lever 377 as far as it is permitted to go to take up the said looseness between the parts, which looseness is taken up by the pawl 379 moving the stop and counting racks 380, 380$^b$ and the angle plate 362 forward, said angle plate in turn moving the T-slide 414 and carrying the gage pin tight against the computing bar. The rearward movement of the rod 455 is thus limited in proportion to the amount of "looseness," or the amount of "difference" to be taken care of in the line. This movement is not great, the movement of the pawl 379 being less than one tooth of the rack, and it is desirable to multiply the movement before causing it to set the controlling device for shifting from one size of space to another. The movement of the rack 380 is multiplied at the free end of the lever 377. A projection 377$^a$ under the free end of lever 377 engages an arm 466 on a rock shaft 467 (Figs. 56 and 57). This shaft is provided with a hub 468 and a plate 469 carrying a pin 469$^a$. A lever 470 is pivoted to a bracket 470$^a$ on the frame and it is engaged near said pivot by the pin 469$^a$. The free end of the lever 470 has a much greater movement than the racks 380, 380$^b$ but this movement is in proportion to the movement of the rack. This free end of lever 470 is connected by link 473 to a ring 480 in which the shaft 464 is free to rotate but not free to slide, the ring 480 being confined between collars 480$^a$ fixed on shaft 464. The movement imparted to the rod 464 serves to locate the stop pawl 465. The lever 462 and rod 455 are drawn to the rear normally against the arm 377 by the spring 472. The rearward movement of pawl 465 is equal to as many teeth of the rack 380 as there are units in the "difference," which equals the number of spaces of one of the sizes to be used in the line. The rod 455 is now moved forward and the elbow lever 462 engages the arm 463 and rocks the shaft 464 bringing the pawl or arm 465 into engagement with the rack 380, the slot 460 permitting shaft 464 to remain as located by link 473. The rocking of the shaft 464 rocks the shaft 467 by means of a slide 474 connecting arms 476 and 478 of said shafts (Fig. 56). This frees the lever 377 from arm 466 and permits rod 455 to draw arm 377 forward until the rear end of pawl 379 engages the pin 384. At the same time the link 383 lifts the locking pawl 381 from the counting rack and permits spring 475 to return said rack to its initial position carrying with it the arm 465 and the shaft 464. This movement of shaft 464 is made to impart a suitable movement to the controlling device for shifting from one size of space to another. The connections between the shaft 464 and the shaft 467 must permit said shafts to slide longitudinally and for this reason an arm 476 of shaft 464 engages a slot 477 in slide 474 while arm or pin 478 on shaft 467 engages a slot 479 on said slide.

A sliding rack 482 has a lug 483 through which the shaft 464 passes. The lug is located between fixed collars 484 on the shaft and they travel together longitudinally although the shaft is free to rotate in the lug. (Figs. 9, 10, 52 and 56.) The rack 482 is connected with a gear 485 on a vertically movable shaft 486 through the medium of an idle gear 485$^a$. On the upper part of the shaft is a pinion 487 which when the shaft is in its lower position engages two gears 488 and 489 mounted on the same stud. When the shaft is in its upper position however the gear 487 engages only the gear 488. The shaft 486 is lowered from its normal position by the rocking of the shaft 464, said shaft 464 having an arm or blade 490 which engages a lever 491 pivoted to a bracket 492 and extending under a fixed collar 493 on said shaft 486.

The gears 488, 489 are moved step by step by a pawl 494 connected to lever 495 which is vibrated by cam projections 496 on a cam V, the lever being held against the cam by a spring 497 (Figs. 10 and 56). A holding pawl 498 is provided to make the teeth of the gears register and prevent backward movement. The pawls 494 and 498 are broad enough to engage both gears and the gears are turned by the pawls until the moving pawl reaches a blank space 499 in each gear formed by the partial removal of a tooth, after which the gears stop until they are reset, as will be presently described. Pawls 494 and 498 are drawn out by means of an arm 500, (Fig. 56) slotted link 501, rock shaft 502 and link 503 operated by a cam lever 504 bearing on cam S (Fig. 8.)

The operation of the "difference devices" is as follows: It will be seen that the rock shaft 464, rack 482, and the gears 487 and 488 are always tied together and move in unison. The gear 489, however, is sometimes tied to these parts and sometimes free, depending upon the position of the gear 487. We will assume that the counting rack 380 has been moved rearward as many teeth as there are intervals in the line under justification. During this movement the arm 465 is disengaged from the rack and shaft 464 therefore freed from it. The shaft 464 has been moved to its normal position by the pawl 494, which pawl is now running idly in the space 499, the shaft 464 being locked in said normal position by the holding pawl 498. The lever 377, shaft 464 and their connected parts are now moved rearward in proportion to the "difference" by the rearward movement of the rod 455, the upper "governor" gear 488 only being in engagement with gear 487 at this time. The arm 465 is then engaged with the rack 380 by the forward movement of rod 455 and gear 487 lowered to engage both gears 488 and 489. The total forward movement of rack 380 will be equal to its total rearward movement which is equal to as many teeth as there are word intervals in the line. This total forward movement is imparted to both gears 488 and 489, setting them back as many teeth as there are intervals in the line. The gear 488, however, is only set back from its normal position in inverse proportion to the "difference," having been previously set forward an amount equal to the difference. During this operation of setting back the gears it will be understood that the pawls 379, 381, 494 and 498 are disengaged. The pawls 494, 498 are now reëngaged and begin to feed the gears forward for purposes to be presently explained.

The gear 488 carries a shield 505 (Fig. 56) against the under side of which is sensitively moved a feeler arm 506 on a rock shaft 507, which shaft is rocked by an arm 508 and cam projections 509 on the bottom of cam V. (Figs. 9, 10, 52, 52ª and 56). The arm 510 is normally drawn toward the cam by a suitable spring 511. On the shaft 507 is an upwardly extending arm 512 which engages and moves the downwardly extending arm 513 of an elbow lever having a horizontal arm 514 which engages a curved arm of a lever 515, (Figs. 42 and 44) which lever is pivoted to the arm 516 of the frame 300 and carrying the justifying type channel L. The curved end of lever 515 is concentric with the shaft 718 so that the arm 514 will engage it in any position of the arm 516. The outer ends of the arm 516 and lever 515 are adapted to be intercepted by the stop pin 452. The operation of this part of the mechanism is as follows: At the beginning of the spacing of a line the shield 505 is set over the feeler 506 as many teeth of the gear 488 as there are spaces of the smaller size in the line. The justifying type channel is set opposite spaces of this smaller size by reason of the contact of the lever 515 with the selected stop pin. Each time a space is inserted the shaft 507 is rocked by the cam V but so long as the shield 505 is over the feeler arm 506 the arm 512 is prevented from operating the levers 513 and 515. Each time a space is inserted the gear 488 is moved forward one tooth by the action of cam V on the pawl lever 495. When the proper number of spaces of the smaller size have been inserted the shield passes off of feeler arm 506 permitting shaft 507 to rock to its full extent and through the connections mentioned to operate the lever 515 raising its outer end over the selected stop pin and permitting the arm 516 to move up against said pin, thus shifting the justifier type channel to the next channel of the space magazine which contains spaces of the next larger size.

The under gear 489 controls the selection of the proper number of spaces from a line and throws the spacing mechanism out of action when this number has been inserted. This gear it will be remembered is set back from the open tooth a number of steps or teeth corresponding to the total number of spaces in the line. The gear 489 is provided with a shield 518 and also with a perforation 519. Under the gear extends a feeler arm 520 having a shoulder 521 extending into the path of the shield 518 and a pin 522 adapted to enter the hole 519 when it registers therewith. The feeler arm 520 is mounted on a shaft 523, the feeler being normally drawn toward its gear by a spring 524. Shaft 523 is rocked by means of an arm 525 (Fig. 56) adjacent to the arm 508 and operated by the cams 509 on cam wheel V. (Fig. 10). On the end of shaft 523 is an arm 526 which stands adjacent to the downwardly extending arm of an elbow lever 527, said elbow lever having a curved horizontal arm extending around shaft 718. (Figs. 10, 44, 51 and 52ª.) Beneath the curved arm of lever 527 is the horizontal arm of an elbow lever 528 which is pivoted to a revolving frame 529 carried upon the shaft 718. Lever 528 has a vertical arm, the upper end of which is opposite the outer end of a slide 530. Slide 530 has a pin-and-slot connection with a link 531, the other end of which is connected to the ejector operating slide 532, (Figs. 44 and 51) said slide 532 being also carried on the swinging frame 529. Frames 529 and 300 are normally held together by a coiled spring 533, (Fig. 51). The outer end of the slide 532 has two projections 534 which are adapted to engage with a projection 535 on the space ejector 536. This ejector has a depressed forward end 537 upon which the lowest space in the space channel 538 rests when the ejector is retracted. When the ejector is driven forward it drives the space into the line and removes the temporary separator as will be hereinafter explained.

The operation of the parts just described is as follows: The wheel 489 being set back and the justifying type channel brought opposite the proper point in the space magazine the shaft 523 is rocked by the cam V and the feeler arm 520 is raised toward the gear 489 each time the gear is moved forward one tooth. The pin 522 strikes the lower surface of the gear each time a space is to be inserted. This permits the shaft 523 to be rocked sufficiently to move the slide 530 inward and engage a pin 539 on said slide with a cam groove on the lower side of cam wheel U. (Fig. 51.) The cam groove thereupon draws the slide 530 inward positively and through the link 531 and slide 532 draws the space ejector in positively carrying the lowest space out of the channel into the line of type. (Fig. 46.) After the pin on feeler arm 520 has been brought against the gear as many times as there are spaces in the line, less one, it registers with the hole 519 in the gear and the feeler arm 520 is permitted to rise a greater amount and rock the shaft 523 to a greater extent than before. This has the effect of putting in the last space in the line and also of closing the line clutch X and starting the cam R which moves the line to the galley by means of connections which will be now described.

On the under side of the rock shaft 523 is an arm 540 to which is connected a rod 541 having in its end a slot 542 in which is pin 543 on an arm 544 of rock shaft 545 (Figs. 1, 2 and 52ª). The slot permits the rod 541 to slide back and forth without operating the rock shaft during the smaller movements of the feeler arm 520 but when the pin enters the hole 519, shaft 545 is rocked. An arm 546 on the lower end of said shaft rocks a clutch lever 547 and arm 548 of which is forked and embraces a member of the line clutch Y. Said member is splined upon the shaft 700 and the line clutch cam wheel S is thereby started. (Figs. 2, 6, 7 and 9.) On the next and succeeding movement of the feeler arm 520 the shoulder 521 engages the shield 518 and the rock shaft 523 is prevented from moving sufficiently to cause the ejection of additional spaces. When cam wheel S has made a revolution the clutch is disengaged and the wheel is stopped by engagement of a pin 548ª with an arm 548ᵇ on the clutch lever (Figs. 2 and 5).

The justifying mechanism heretofore described selects the proper combination of spaces to justify the line and effect the insertion of the proper number of spaces of each size in the combination. It remains to describe the movements of the justifying type channel which carries the type from the assembling type channel to the space magazine and, after the spaces are inserted, carries the line to the galley.

The rack 304 which operates the pinion 303 connected to the swinging frame 300, heretofore referred to, is operated by a rod 549 connected to the free end of a lever 550. (Fig. 3.) Lever 550 is provided with a fulcrum pin 552. The lever is connected by link 551 to the slide 553 which is reciprocated in one direction by a groove in cam R. In the other direction motion is imparted to the lever by a spring 554, which spring pushes the rack 304 rearward and imparts a yielding or sensitive forward movement to the arm 300.

Referring to Figs. 39 and 40 it will be seen that the bars 332 carrying the feet 333 are connected by a yoke 555. The parts are moved vertically by the arm 331 on rock shaft 330 as heretofore described. The horizontal reciprocating movement of the feet is accomplished by devices illustrated in Fig. 40. These consist of a pair of spring fingers 556 pivotally connected to the transferring bars 312. In the yoke 555 is a U-shaped piece 557. The spring fingers 556 are inclined on their outer lower sides whereby when the yoke 555 is raised with the U-shaped piece under the fingers said piece will cam or press the fingers together and connect said fingers and the U-shaped piece frictionally. This takes place as the foot 333 is raised and before the transferring bars 312 are pushed forward to transfer the line to the justifier type channel. On the forward movement of the bars 312 the feet 333 are carried forward to support the type by the connection of the yoke with the fingers 556. After a partial movement in this direction the fingers snap off the yoke as shown in Fig. 40 and the feet 333 are free to return to normal position, the type being supported in the justifying channel. The fingers are normally pressed apart by a spring 558.

The vertically movable rod 302 is raised and lowered at proper intervals by a lever 559 operated by cam S. (Figs. 9 and 51.) This rod carries an arm 560 which in turn carries a bar 561 sliding vertically in the justifier type channel L. Upon the lower end of the rod 561 is a block or head 562 having a notch 563 (Fig. 46ª). The justifier type channel L is connected to rod 561 by a spring 564. The weight block 321 which rests on the type in the assembling channel has a toe 565 which enters the notch 563 at the proper time serving to register the head 562 with the weight block to confine the line when it is being transferred.

The line having been transferred to the justifier channel L, as previously explained, the arm 300 carrying the channel swings forward until the lever 515 engages the stop pin 452 which has been set by the justifier. During the first part of this movement the line of type is supported upon a circular platform 566. When opposite the first channel of the space magazine M the arm 300 overtakes the arm 529 which has been detained at this point and thereafter they move together. The space channel and its line are now free to descend and they do descend until a projecting pin 567 on the lowest temporary separator N engages a stop 568 (Figs. 46 and 57) which is pivotally carried by the frame 529. The justifier channel is now stopped opposite the proper channel 538 of the space magazine and the space is inserted and the temporary separator removed as heretofore described. As soon as the space plunger is withdrawn the line is free to descend until the next succeeding separator is engaged by the stop 568. The proper number of spaces of the first size are thus inserted and the parts are then moved, as heretofore described, to the next channel, when the balance of the spaces are inserted in the same manner. As the last space is inserted the galley mechanism is started by reason of the pin 522 entering the hole 519 in wheel 489 as heretofore stated. The stop pin 452 is withdrawn and the type channel is permitted to move into a position opposite the galley as indicated in Fig. 45. As the channel reaches this position the gate 310 is withdrawn by reason of its lever 311 encountering a fixed stop. The line pusher 569 (Figs. 51 and 51ª) is now forwarded to drive the line out of the channel into the galley. Connected to this pusher is a cam lever 570, the lower end of which normally runs in a circular cam groove in cam wheel U. As the justifying channel reaches the galley, lever 570 encounters an incline face 571 on a small lever 572 pivoted to a lever 573 and normally held in the position shown in Fig. 51ª by a spring 574. The inclined face 571 throws the end of lever 570 into a branch cam groove which during the succeeding revolution of wheel U imparts a reciprocating movement to the line ejector, the lever 570 being confined within limits by pins 575 upon said ejector. (Fig. 51.) The lever 573 is normally held against a stop pin 576 by a spring 577. Should the lever 570 strike the inclined surface 571 when said lever 570 does not register with the opening between the cam groove S it will rock the lever 573 and rest upon surface 571 until the opening registers with the lever, the spring 577 being meantime extended. As soon as the opening in the inner cam reaches lever 570, spring 577 will cause it to enter the opening and operate the line ejector.

The line of type is fed into the galley between a slide 590 and an end gate 591 which stand normally in the positions shown in Figs. 45, 50 and 51. After the line is in position between these parts slide 590 is withdrawn and the end gate moves the line into the galley beyond the slide. The slide and end gate are then restored to their normal positions ready to receive a new line. The slide 590 is operated by the cam wheel R through slide 592, link 593 and elbow lever 594. The end gate 591 is operated from the same cam lever by the slide 595 and link 596, the end gate being pivotally connected to the frame at 597.

The mechanism for shifting the line from the assembling channel to the justifier channel is started by the pusher 215 which is brought into action by a perforation or perforations in the strip indicating the end of a line, as heretofore explained. This pusher through an arm 579, rock shaft 580, and arm 581 rocks a hammer lever 582 carrying a hammer 583. Under this hammer is a part 584 capable of sliding movement and a slight oscillation on a pivot 585. The hammer moves the slide 584 downward until its lower end engages a cam 586 (Figs. 39 and 41) on cam wheel T. The cam 586 throws the lower end of lever 584 inward engaging the roller on slide 296 with the cam groove 299 and thus through connections previously described operating the devices for shifting the line from the assembling channel to the justifier channel. The cam 586 is inclined upward at its rear end and as the wheel T revolves it serves to restore the slide 584 to its elevated position, in which position it is retained by a friction spring 587.

Rock shaft 580 has an arm 588 (Fig. 41) which is connected by a link 589 (Fig. 7) with arm 544 of the rock shaft 545, which rock shaft, as previously described, operates the clutch Y to start the cam wheel S.

The cam wheels R and S both control line movements. The mechanism for starting and stopping the cam wheel S has been heretofore described. The clutch X for the cam wheel R is operated from cam wheel S by means of cam lever 598, link 599, and clutch lever 600 (Figs. 2, 5 and 9). Clutch lever 600 carries an arm 601 adapted to engage a pin 602 on the cam wheel R when the clutch is thrown out of engagement to stop the cam wheel at the proper point.

The various mechanisms hereinbefore described are driven from a power shaft 700 having a suitable drive pulley (Fig. 6 and others). Power is communicated from the shaft 700 directly to the cam wheel S by the clutch Y, the cam wheel being mounted on the shaft 700. The carrier wheel is mounted on a vertical shaft 705 which is driven from the line shaft by means of bevel gears 701, shaft 702, pinion 703 and gear 704. The shaft 710 which carries the clutch X and upon which the cam wheel R is loosely mounted, is driven from the shaft 705 by means of bevel gears 706, 707, shaft 708 and bevel gears 709. The cam wheel U is constantly driven from the shaft 702 by means of gear 711, pinion 712, gears 713 and 714, shaft 715, gear 716 and gear 717 on the shaft 718 to which the cam wheel U is connected (Figs. 6 and 45).

In describing the various mechanisms I have also described their operation and it will only be necessary in closing to mention the order in which the principal movements take place. The carrier wheel rotates continuously and as long as the perforated strip is provided the keys F are set in succession, and each key in the course of a revolution of the carrier wheel unlocks a type channel and causes a type to be delivered to its carrier. The type are thus rapidly taken by the carriers and delivered to the assembling type channel. The words are separated in the type channel by the separators which are also selected by a lock and key, the word separators being also represented by perforations on the controlling strip. At the end of each line a perforation or group of perforations on the strip sets a key in such a manner as to operate a lock which starts the line mechanism, that is, it starts the line cams R and S. During the assembling of the line the separators are counted on the counting rack. When the line mechanism starts the line is immediately measured in the assembling channel. The devices which measure the line and count the spaces are utilized to set the computing bar and the line gage T-blade. Between the line measuring device and the line gage T-blade is the adjustable angle plate 362 which eliminates the width of the separators from the measurement of the line so that the T-blade is set according to the width of the type only in the line just as if they were measured without separators. The gage block is now moved along the T-blade until it is intercepted by the computing bar after which it is moved back slightly until the pin 404 stands over the lever corresponding to the first size of space to be inserted. The amount of backward movement corresponds to the "difference" and the difference devices are brought into action to set the controller which determines the number of spaces of the first size, which controller is set backward a corresponding amount. The stop pin for the first size of space having been selected and the controller set to effect the change in size at the proper time, the line of type, which has simultaneously been transferred to the justifying channel, is brought opposite the proper space channel. The justifying spaces of the first size are inserted in lieu of separators until a sufficient number have been introduced into the line. The line is then shifted to the next space channel and the balance of the separators are ejected and spaces introduced in their places. After the last space has been inserted in the line the justifying channel swings into position opposite the end of the galley and the line is shifted into the galley.

The operation of the machine is purely automatic and if the controlling strip is properly perforated the matter composed will be correct and properly justified. In the present machine blank spaces must be left between the line groups of perforations in the controller strip to give the machine time to measure the line in the assembling channel before it is transferred to the justifying channel. This is made necessary by the rapidity with which the machine selects the type and conveys them to the assembling channel.

Having described my invention what I claim and desire to secure by Letters Patent is:

1. In a justifying mechanism, the combination of a counting rack and means for setting the same in accordance with the number of separators in a line, a measuring device arranged to be set in accordance with the amount of matter in the line, and an angular device having connections with said rack and measuring device, said angular device being adapted to eliminate the width of the separators from the measurement of the line.

2. In a justifying mechanism, the combination of the counting rack, the line measuring device, and the separator eliminating device, with the line gage T-blade, the computing bar, and the gage coöperating with said T-blade and bar.

3. In a justifying mechanism, the combination of the line measuring device and the separator counting device, the T-blade and the computing bar adapted to be set by said devices, the gage block, the difference devices, and the controller arranged to be set by said difference devices.

4. In a type justifying machine, the combination with a stationary space magazine and a line channel movable to register with any channel of the space magazine, of mechanism governing the movements of the line channel and mechanism for transferring justifying spaces from the magazine into said channel.

5. In a justifying mechanism, a justifying line channel arranged to move between an assembling channel and a galley, a space magazine between said assembling channel and the galley, means for controlling the movement of the justifying channel and causing it to register with the proper channels of the space magazine, means for transferring justifying spaces from the magazine to the line channel to justify the line, and means for transferring the justified line to the galley.

6. In a type justifying machine, in combination, a channel adapted to hold a line of type, a measuring slide, means for moving said slide to position to indicate the length of the line, and means for locking the slide in said position.

7. In a type justifying machine, in combination, the line measuring channel, the slide 323 in line with said channel and adapted to be raised in proportion to the length of the type line therein, a line measuring slide, means for positively moving said measuring slide, and devices carried by the measuring slide for releasing the same from its moving means, said devices being operated by contact with the slide 323.

8. In a type justifying machine, a slide 323 arranged to indicate the length of a line for measurement, and an arm carried by said slide, in combination with a measuring slide 341, an arm carried by said measuring slide, a bar 345, a pawl arranged to connect the slide 341 positively with said bar, a lever 356 and connections for releasing said pawl when said lever is intercepted by the arm of slide 323, and means for positively moving the bar 345, for the purpose set forth.

9. In a type justifying machine, an angle plate, such as plate 362, in combination with means for moving said plate in two directions in accordance with the shortage of, and number of intervals in, a line of type.

10. In a type justifying machine, a measuring bar adapted to be set in accordance with the shortage of a line to be justified, in combination with an angle plate, such as plate 362, connected to move with said bar, and means for moving said plate laterally to the direction of motion of said bar in accordance with the number of intervals in the line.

11. In a type justifying machine, the combination with a channel for holding a line of type, a measuring bar, means for automatically setting and locking said bar in a position corresponding with the shortage of the line, an angle plate carried by said bar and movable laterally thereto, and means for imparting a lateral movement to said plate in accordance with the number of intervals in a line to be justified.

12. In a type justifying machine, the combination of a line measuring bar, a separator counting rack, and an angle plate, said angle plate being movable in one direction by said bar and in a second direction by said rack, for the purpose set forth.

13. In a type justifying machine, in combination, a pair of slides, the T-blade connected to one of said slides, a pivoted computing bar connected to the other slide, and means for simultaneously setting said slides in accordance with the number of intervals and the shortage in a line to be justified.

14. In a type justifying machine, the combination of the computing bar, the slide for setting said bar, means for moving said slide positively, and a trigger for releasing said slide from its moving means.

15. In a type justifying machine, the combination of a T-blade adjustable in accordance with the shortage of a line, a slide to which said T-blade is connected, means for moving said slide positively to adjust the T-blade, and a trigger for releasing said slide from its moving means.

16. In a type justifying machine, the combination of an angle plate adjustable in accordance with the shortage of a line, a T-blade, a slide upon which said T-blade is carried, and means for moving said slide into contact with the angle plate to determine the adjustment of the T-blade.

17. In a type justifying mechanism, the combination of the angle plate adjustable in two directions in accordance with the line shortage and number of intervals, the T-blade, the pivoted computing bar, the slides by means of which said blade and bar are adjusted, means for moving said slides positively, and devices for releasing said slides from their moving means when they are properly adjusted by the angle plate.

18. In a type justifying machine, the combination with the T-blade and computing bar, of slides connected to said blade and bar, means for adjusting the slides in accordance with the line shortage and number of intervals, and means for locking said blade and bar in their adjusted positions.

19. In a type justifying machine, the combination with the T-blade and computing bar, of the slides connected thereto, means for moving said slides positively in one direction, triggers for releasing the slides from their moving means, means for locking and unlocking the slides, and means for returning said slides to their initial positions.

20. In a type justifying machine, the combination with a computing bar, a sliding T-blade, and means for setting said bar and blade in accordance with the shortage and number of intervals in a line, of a gage block carried by the sliding T-blade, a reciprocating part, such as 434, adapted to move said gage block in one direction, means for engaging the gage block with said part during its movement in the opposite direction, and means for releasing the gage block from said part when it is intercepted by the computing bar.

21. In a type justifying machine, the combination with a pivoted computing bar, and a sliding T-blade, of a gage block arranged to slide on the T-blade and to be intercepted by the computing bar, a part, such as 434, arranged to move said gage block positively in one direction, and a spring pawl mounted on the gage block and adapted to engage said part and draw the gage block in the opposite direction, said computing bar being arranged in the path of said pawl and adapted to withdraw the pawl and release the gage block during the return movement thereof.

22. In a type justifying machine, the combination with a pivoted computing bar, and a sliding T-blade, of a gage block sliding in guides on said blade, a reciprocating rod, such as 433, mounted in an opening in said gage block, a head on said rod, a spring interposed between said head and gage block and adapted to urge the gage block in one direction, a collar on said rod adapted to move the gage block in the opposite direction, and a projection on said gage block adapted to be intercepted by the computing bar.

23. In a type justifying machine, the combination with the pivoted computing bar, and the sliding T-blade, of the gage block mounted to reciprocate on said T-blade, a plunger connected with the gage block, a series of stop levers, means for depressing the plunger, and means for directing said plunger against one of said stop levers.

24. In a type justifying machine, in combination, a bar having a series of teeth having inclined guiding faces, the face of each incline corresponding to one of a series of justifying spaces, a plunger, mechanism for locating the plunger with reference to the bar according to the normal justifying space for a line, and means for applying the plunger to the inclined guide with which it registers to select a justifying space approximating the normal space.

25. In a type justifying machine, in combination, a series of stops corresponding to a graduated series of justifying spaces, a plunger, and a series of inclined guides for said plunger adapted to direct the same to operate one or other of said stops.

26. In a type justifying machine, a series of stops corresponding to a graduated series of justifying spaces, a plunger and devices for locating the same with relation to said stops, and a series of guides, all inclined in one direction, said guides being adapted to direct the plunger to operate one or other of said stops.

27. In a type justifying machine, the combination with a pivoted computing bar, a sliding T-blade, and a gage block carried by said T-blade, of a series of stops corresponding to a graduated series of justifying spaces, and means carried by the gage block for operating any one of said stops.

28. In a type justifying machine, the combination of a series of stops corresponding to a graduated series of justifying spaces, a rack having a series of inclines, a plunger and means for locating the same in accordance with the normal justifying space for a line, and means for depressing said plunger into engagement with one of the inclines of the rack, said plunger being free to be moved by the engaging incline into a position for operating one of said stops.

29. In a type justifying machine, the combination of the pivoted computing bar, the sliding T-blade, the gage mounted in guides on said T-blade, and the arm on said gage, of the slide mounted on the guide parallel with the T-blade and in engagement with said arm, the pivoted arm on said slide, the spring arranged to hold said pivoted arm normally in a given position, a plunger on said pivoted arm, and a series of stops adapted to be operated by said plunger.

30. In a type justifying machine, the combination with a series of stops corresponding to a graduated series of spaces, a series of levers connected to said stops, and a rack extending over said levers and provided with a series of inclines, of a plunger arranged to travel over said rack, means for locating the plunger in accordance with the normal justifying space for a line, and a bar above the plunger adapted to depress said plunger in any position in which it may be located.

31. In a type justifying machine, means for inserting justifying spaces of two consecutive sizes in a line comprising a series of stops corresponding to the several sizes of spaces provided in the machine, automatic means for bringing into action the step corresponding to the first size required for the line, and a governing device for shifting to the second size at the proper time, said device comprising a part and means for setting the same back a number of points equal to the number of spaces of the first size required, and means for feeding said part forward one point for each space inserted.

32. In a type justifying machine, means for inserting spaces of two consecutive sizes in a line, comprising means for selecting one size of spaces, a difference device, a governor consisting of a toothed wheel adapted to be set back by the difference device a number of teeth equal to the number of spaces of the first size required, a pawl adapted to move said wheel forward one tooth each time a space is inserted, a guard carried by said toothed wheel, and means controlled by the guard for shifting from one size of spaces to another.

33. In a type justifying machine, the governing mechanism comprising, in combination, a toothed wheel, moving and holding pawls therefor, a cam operating the moving pawl once for each space inserted in the line, a difference device arranged to automatically set back said toothed wheel a number of teeth equal to the number of spaces of the first size in the line, a guard carried by said wheel, a rocker arm arranged to be stopped by said guard, and connections of said rocker arm for shifting from one size of space to another, the said guard being constructed and arranged to stop said arm until the proper period for changing the size of spaces.

34. In a type justifying machine adapted to justify lines of type with two consecutive sizes of spaces, the combination of two governing devices, one device adapted to be set back an amount corresponding to the number of spaces of the first size required, and the other device adapted to be set back an amount corresponding to the total number of intervals in the line, said governing devices being moved forward one point each time a space is inserted, for the purpose set forth.

35. In a type justifying machine, the combination of a line measuring channel, a space magazine, and a movable justifying channel adapted to receive the line from the measuring channel and carry it to the space magazine.

36. In a type setting and justifying machine, means for assembling a line of type, a channel in which said type are assembled, a space magazine, a second channel movable from the assembling channel to the space magazine, means for transferring the line to said movable channel, means for stopping said movable channel opposite the proper channels of the space magazine, and means for transferring spaces from said magazine to the line in said channel.

37. In a type setting and justifying machine, the combination with a channel in which lines of type are assembled, of a space magazine having its channels arranged in the arc of a circle, a justifying channel carried by a swinging frame, means for transferring the line from the assembling channel to the justifying channel, and means for swinging said justifying channel to the space magazine.

38. In a type setting machine, the combination with a stationary space magazine, of a justifying channel adapted to carry a line of type to any channel of said magazine, means for feeding a line endwise in said justifying channel to bring the separators therein opposite the ejector of the space magazine, and means for ejecting said separators and injecting spaces in the line.

39. In a type justifying machine, the combination with a fixed space magazine, and a justifying channel movable to carry a line of type into register with any channel of said magazine, of a series of stops for said justifying channel, means for setting one of said stops to locate the justifying channel opposite the magazine channel containing the first size of spaces for the line, and means for shifting said justifying channel to the adjacent magazine channel during the justification of a line.

40. In a type justifying machine, the combination with a space magazine arranged in the arc of a circle, of a justifying channel carried by a swinging frame, a series of stops for said frame arranged in the arc of a circle, and a pivoted arm carried by said frame and adapted to engage any one of said stops, for the purpose set forth.

41. In a justifying mechanism, in combination, a toothed wheel adapted to be set back as many points as there are intervals in a line, means for moving said wheel forward one point each time a space is inserted, a feeler contacting with said wheel each time a space is inserted, an opening in the wheel into which the feeler falls as the last space is inserted, and means for closing a line clutch when the feeler enters said opening.

42. In a justifying mechanism, in combination, a toothed governor wheel having an opening therein, means for setting said wheel backward an amount corresponding to the number of intervals in a line, a rock shaft, a feeler carried by said rock shaft and coöperating with said wheel, a line clutch, and means for closing the line clutch when the feeler enters said opening, said wheel being moved one tooth each time a space is inserted in the line.

43. In a justifying mechanism, in combination, a governor wheel, a feeler coöperating therewith, a space magazine, a space ejector, and a line clutch mechanism, said feeler being connected with said space ejector and also with said line clutch mechanism, for the purpose set forth.

44. In a type justifying mechanism, in combination, a vertical rotating shaft, a space magazine concentric with said shaft, a space ejector, and a cam on said shaft for operating said space ejector.

45. In a type justifying machine, in combination, a vertical shaft, a cam wheel on said shaft provided with a cam groove, a space magazine concentric with said shaft, a space ejector, a pin connected with said ejector and normally out of said cam groove, and means for bringing said pin periodically into engagement with said cam groove.

46. In a type justifying mechanism, in combination, a vertical shaft, a space magazine having its channels arranged in a circle concentric with said shaft, a frame arranged to swing about said shaft, a justifying channel carried by said frame, a second frame pivoted on said shaft, a space ejector carried by said second frame, and a spring operating to normally hold said frames in coöperative relation.

47. In a type justifying mechanism, in combination, a space magazine, a justifying channel adapted to receive an unjustified line, means for moving said channel to bring it into register with any one of the space channels, means for feeding a line of type intermittently in the justifying channel to bring the separators successively opposite the lowest spaces in the space magazine, and an ejector arranged to eject the separators and inject spaces in lieu thereof into the line.

48. In a type justifying machine, in combination, a vertically arranged justifying channel, means for feeding a line of type and separators through said channel, a space magazine having vertical channels, means for intercepting the separators in the line successively opposite the lowest space in a space channel, and a space ejector adapted to dislodge a separator and substitute a space therefor in the line.

49. In a type justifying machine, in combination a vertical shaft, a space magazine having its channels arranged concentric with said shaft, a frame swinging about said shaft, a space ejector carried by said frame, a cam on the shaft for reciprocating said space ejector, and a lever for bringing said space ejector periodically into engagement with said cam, said lever having a portion concentric with the shaft whereby the space ejector may be operated in any position.

50. In a type justifying machine, a governor device comprising a toothed wheel, a segmental guard carried by said wheel, a pawl, pawl lever and cam operating to give said wheel a step by step movement, a rock shaft having a feeler arm coöperating with said shaft, and means for rocking said shaft.

51. In a type justifying machine, in combination, a type assembling channel, a galley, a justifying channel, a pivotally mounted frame supporting said justifying channel and arranged to carry the same from the assembling channel to the galley, a space magazine intermediate the assembling channel and the galley, means for transferring spaces from the space magazine to the justifying channel, and means for ejecting the line of type from the justifying channel to the galley.

52. In a justifying mechanism, in combination, a justifying type channel, a vertical shaft, a frame swinging upon said shaft and carrying said channel, a galley, means for ejecting the line from the channel to the galley, and a cam mounted on the shaft and operating said line ejecting means.

53. In a justifying machine, in combination, a galley, a justifying channel movable to and from the galley, a rotating cam, a line ejector operated by the cam, and means for bringing said ejector into engagement with the cam, said means being brought into action by the arrival of the justifying channel at the galley.

54. In a type justifying machine, in combination, a galley, a justifying type channel movable to and from the galley, an ejector for transferring a line from the channel to the galley, a rotating cam wheel having therein a concentric groove and an eccentric branch groove, a part connected with the ejector and normally standing in the concentric groove, and means for directing said part into the eccentric groove to operate the ejector periodically.

55. In a type setting and justifying machine, in combination, an assembling channel, a movable justifying channel, means for bringing said channels together, and means for transferring a line of type from the assembling channel to the justifying channel.

56. In a type setting and justifying machine, in combination, an assembling channel, means for assembling a line of type therein, a space magazine, a justifying channel movable from the assembling channel to the space magazine, and means for inserting justifying spaces in a line carried by the justifying channel while a succeeding line is being assembled in the assembling channel.

57. In a type setting and justifying machine, in combination, an assembling channel, a justifying channel movable to and from the assembling channel, and means for transferring a line of type laterally from the former channel to the latter.

58. In a type setting and justifying machine, in combination, an assembling channel having a movable side wall, a justifying channel having a movable side wall, means for bringing said channels together and withdrawing their adjacent movable walls, and means for transferring a line of type from the assembling channel to the justifying channel while the adjacent walls are withdrawn.

59. In a type setting and justifying machine, an assembling channel having a side wall composed of two retractable portions, means for withdrawing said portions, and means for clamping the line and moving it out of the assembling channel between said retractable portions.

60. In a type setting and justifying machine, in combination, an assembling channel having a retractable side wall, a justifying channel movable to and from the assembling channel and having also a retractable side wall, means for engaging the retractable walls of said channels and retracting them simultaneously, and means for transferring the line of type from one channel to the other while the walls are retracted.

61. In a type setting and justifying machine, in combination, an assembling channel, a justifying channel, automatic justifying means including means for measuring the type, and means for transferring a line of type from the assembling channel to the justifying channel.

62. In a mechanism for justifying lines of type composed with temporary separators, measuring devices for measuring the line, including means for eliminating from the measurement a predetermined portion of the line length occupied by the temporary separators.

63. In a mechanism for justifying lines of type composed with temporary separators, the combination with justifying space selecting devices, of measuring devices for measuring the line provided with means for eliminating from the measurement and from the operation of the space selecting devices a predetermined portion of the line length occupied by the temporary separators.

64. In a mechanism for justifying lines of type composed with temporary separators, measuring devices for measuring the line, including means for eliminating from the measurement the total space occupied in the line by the temporary separators.

65. In an automatic type setting and justifying machine, the combination with automatic devices for assembling a line of type and a controller therefor, of a space counting device actuated by the controller.

66. In a machine for justifying a line of type composed with temporary separators, the combination with line measuring and space registering devices, computing devices for determining justifying space values from the line shortage and number of intervals in the line, of means for moving one of the measuring elements in the line of measurement to eliminate from the measurement a predetermined portion of the line length occupied by the separators.

67. In a type setting and justifying machine, the combination with an assembling channel, and automatic means for measuring the type in said channel, of a justifying channel, automatic justifying means, and means for transferring the measured line of type from the assembling channel to the justifying channel.

In testimony whereof I affix my signature, in presence of two witnesses.

BENJAMIN M. DES JARDINS.

Witnesses:
CHARLES J. WITTMANN,
EVA S. SHELTON.

Copies of this patent may be obtained for five cents each, by addressing the "Commissioner of Patents, Washington, D. C."